United States Patent
Hosseini et al.

(10) Patent No.: US 10,714,984 B2
(45) Date of Patent: *Jul. 14, 2020

(54) SYSTEMS, METHODS, AND DEVICES FOR USING A BATTERY AS AN ANTENNA FOR RECEIVING WIRELESSLY DELIVERED POWER FROM RADIO FREQUENCY POWER WAVES

(71) Applicant: Energous Corporation, San Jose, CA (US)

(72) Inventors: Alister Hosseini, Phoenix, AZ (US); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/182,518

(22) Filed: Nov. 6, 2018

(65) Prior Publication Data

US 2019/0173323 A1 Jun. 6, 2019

Related U.S. Application Data

(63) Continuation of application No. 15/952,097, filed on Apr. 12, 2018, now Pat. No. 10,122,219, which is a
(Continued)

(51) Int. Cl.
*H02J 50/27* (2016.01)
*H02J 7/02* (2016.01)
(Continued)

(52) U.S. Cl.
CPC .......... *H02J 50/27* (2016.02); *H01M 10/425* (2013.01); *H01M 10/44* (2013.01); *H02J 7/0068* (2013.01);
(Continued)

(58) Field of Classification Search
CPC ...................................................... H02J 50/27
(Continued)

(56) References Cited

U.S. PATENT DOCUMENTS

| 787,412 A | 4/1905 | Tesla |
| 3,167,775 A | 1/1965 | Guertler |

(Continued)

FOREIGN PATENT DOCUMENTS

| CN | 102292896 A | 12/2011 |
| CN | 102860037 A | 1/2013 |

(Continued)

OTHER PUBLICATIONS

Energous Corp., ISRWO, PCT/US2014/037170, Sep. 15, 2014, 11 pgs.

(Continued)

*Primary Examiner* — Adi Amrany
(74) *Attorney, Agent, or Firm* — Morgan, Lewis & Bockius LLP

(57) ABSTRACT

Methods of constructing a wireless power receiver that uses a battery as an antenna are provided. The method includes power conversion circuitry that has a connector, the first end connected to at least a part of a battery, and the part of the battery is configured to act as an antenna and receive radio frequency (RF) power signals. The second end of the connector is opposite to the first end and connected to the power conversion circuitry. The power conversion circuitry converts the RF power signals into a direct current (DC) voltage that is used to charge the battery. Additional, some methods for constructing a wireless power receiver include a different connector between the power conversion circuitry and charging circuitry. The charging circuitry is electrically coupled with at least the part of the battery via another connector and provides DC voltage to charge the battery.

20 Claims, 6 Drawing Sheets

Related U.S. Application Data continuation of application No. 15/785,324, filed on Oct. 16, 2017, now abandoned.

(60) Provisional application No. 62/570,542, filed on Oct. 10, 2017.

(51) Int. Cl.

| | | |
|---|---|---|
| *H02J 7/00* | (2006.01) | |
| *H01M 10/44* | (2006.01) | |
| *H01M 10/42* | (2006.01) | |

(52) U.S. Cl.
CPC ..... *H02J 7/025* (2013.01); *H01M 2010/4271* (2013.01); *H01M 2010/4278* (2013.01); *H01M 2220/30* (2013.01)

(58) Field of Classification Search
USPC .......................................... 307/2, 104, 151
See application file for complete search history.

(56) References Cited

U.S. PATENT DOCUMENTS

| | | | |
|---|---|---|---|
| 3,434,678 | A | 3/1969 | Brown et al. |
| 3,696,384 | A | 10/1972 | Lester |
| 3,754,269 | A | 8/1973 | Clavin |
| 4,101,895 | A | 7/1978 | Jones, Jr. |
| 4,360,741 | A | 11/1982 | Fitzsimmons et al. |
| 4,944,036 | A | 7/1990 | Hyatt |
| 4,995,010 | A | 2/1991 | Knight |
| 5,200,759 | A | 4/1993 | McGinnis |
| 5,211,471 | A | 5/1993 | Rohrs |
| 5,548,292 | A | 8/1996 | Hirshfield et al. |
| 5,556,749 | A | 9/1996 | Mitsuhashi et al. |
| 5,568,088 | A | 10/1996 | Dent et al. |
| 5,646,633 | A | 7/1997 | Dahlberg |
| 5,697,063 | A | 12/1997 | Kishigami et al. |
| 5,712,642 | A | 1/1998 | Hulderman |
| 5,936,527 | A | 8/1999 | Isaacman et al. |
| 5,982,139 | A | 11/1999 | Parise |
| 6,046,708 | A | 4/2000 | MacDonald, Jr. et al. |
| 6,127,799 | A | 10/2000 | Krishnan |
| 6,127,942 | A | 10/2000 | Welle |
| 6,163,296 | A | 12/2000 | Lier et al. |
| 6,271,799 | B1 | 8/2001 | Rief |
| 6,289,237 | B1 | 9/2001 | Mickle et al. |
| 6,329,908 | B1 | 12/2001 | Frecska |
| 6,400,586 | B2 | 6/2002 | Raddi et al. |
| 6,421,235 | B2 | 7/2002 | Ditzik |
| 6,437,685 | B2 | 8/2002 | Hanaki |
| 6,456,253 | B1 | 9/2002 | Rummeli et al. |
| 6,476,795 | B1 | 11/2002 | Derocher et al. |
| 6,501,414 | B2 | 12/2002 | Arndt et al. |
| 6,583,723 | B2 | 6/2003 | Watanabe et al. |
| 6,597,897 | B2 | 7/2003 | Tang |
| 6,615,074 | B2 | 9/2003 | Mickle et al. |
| 6,650,376 | B1 | 11/2003 | Obitsu |
| 6,664,920 | B1 | 12/2003 | Mott et al. |
| 6,798,716 | B1 | 9/2004 | Charych |
| 6,803,744 | B1 | 10/2004 | Sabo |
| 6,853,197 | B1 | 2/2005 | McFarland |
| 6,856,291 | B2 | 2/2005 | Mickle et al. |
| 6,911,945 | B2 | 6/2005 | Korva |
| 6,960,968 | B2 | 11/2005 | Odendaal et al. |
| 6,967,462 | B1 | 11/2005 | Landis |
| 6,988,026 | B2 | 1/2006 | Breed et al. |
| 7,003,350 | B2 | 2/2006 | Denker et al. |
| 7,027,311 | B2 | 4/2006 | Vanderelli et al. |
| 7,068,234 | B2 | 6/2006 | Sievenpiper |
| 7,068,991 | B2 | 6/2006 | Parise |
| 7,079,079 | B2 | 7/2006 | JO et al. |
| 7,183,748 | B1 | 2/2007 | Unno et al. |
| 7,191,013 | B1 | 3/2007 | Miranda et al. |
| 7,193,644 | B2 | 3/2007 | Carter |
| 7,196,663 | B2 | 3/2007 | Bolzer et al. |
| 7,205,749 | B2 | 4/2007 | Hagen et al. |
| 7,215,296 | B2 | 5/2007 | Abramov et al. |
| 7,222,356 | B1 | 5/2007 | Yonezawa et al. |
| 7,274,334 | B2 | 9/2007 | o'Riordan et al. |
| 7,274,336 | B2 | 9/2007 | Carson |
| 7,351,975 | B2 | 4/2008 | Brady et al. |
| 7,359,730 | B2 | 4/2008 | Dennis et al. |
| 7,372,408 | B2 | 5/2008 | Gaucher |
| 7,392,068 | B2 | 6/2008 | Dayan |
| 7,403,803 | B2 | 7/2008 | Mickle et al. |
| 7,443,057 | B2 | 10/2008 | Nunally |
| 7,451,839 | B2 | 11/2008 | Perlman |
| 7,463,201 | B2 | 12/2008 | Chiang et al. |
| 7,471,247 | B2 | 12/2008 | Saily |
| 7,535,195 | B1 | 5/2009 | Horovitz et al. |
| 7,614,556 | B2 | 11/2009 | Overhultz et al. |
| 7,639,994 | B2 | 12/2009 | Greene et al. |
| 7,643,312 | B2 | 1/2010 | Vanderelli et al. |
| 7,652,577 | B1 | 1/2010 | Madhow et al. |
| 7,679,576 | B2 | 3/2010 | Riedel et al. |
| 7,702,771 | B2 | 4/2010 | Ewing et al. |
| 7,786,419 | B2 | 8/2010 | Hyde et al. |
| 7,812,771 | B2 | 10/2010 | Greene et al. |
| 7,830,312 | B2 | 11/2010 | Choudhury et al. |
| 7,844,306 | B2 | 11/2010 | Shearer et al. |
| 7,868,482 | B2 | 1/2011 | Greene et al. |
| 7,898,105 | B2 | 3/2011 | Greene et al. |
| 7,904,117 | B2 | 3/2011 | Doan et al. |
| 7,911,386 | B1 | 3/2011 | Ito et al. |
| 7,925,308 | B2 | 4/2011 | Greene et al. |
| 7,948,208 | B2 | 5/2011 | Partovi et al. |
| 8,055,003 | B2 | 11/2011 | Mittleman et al. |
| 8,070,595 | B2 | 12/2011 | Alderucci et al. |
| 8,072,380 | B2 | 12/2011 | Crouch |
| 8,092,301 | B2 | 1/2012 | Alderucci et al. |
| 8,099,140 | B2 | 1/2012 | Arai |
| 8,115,448 | B2 | 2/2012 | John |
| 8,159,090 | B2 | 4/2012 | Greene et al. |
| 8,159,364 | B2 | 4/2012 | Zeine |
| 8,180,286 | B2 | 5/2012 | Yamasuge |
| 8,228,194 | B2 | 7/2012 | Mickle |
| 8,234,509 | B2 | 7/2012 | Gioscia et al. |
| 8,264,101 | B2 | 9/2012 | Hyde et al. |
| 8,264,291 | B2 | 9/2012 | Morita |
| 8,276,325 | B2 | 10/2012 | Clifton et al. |
| 8,278,784 | B2 | 10/2012 | Cook et al. |
| 8,284,101 | B2 | 10/2012 | Fusco |
| 8,310,201 | B1 | 11/2012 | Wright |
| 8,338,991 | B2 | 12/2012 | Von Novak et al. |
| 8,362,745 | B2 | 1/2013 | Tinaphong |
| 8,380,255 | B2 | 2/2013 | Shearer et al. |
| 8,384,600 | B2 | 2/2013 | Huang et al. |
| 8,410,953 | B2 | 4/2013 | Zeine |
| 8,411,963 | B2 | 4/2013 | Luff |
| 8,432,062 | B2 | 4/2013 | Greene et al. |
| 8,432,071 | B2 | 4/2013 | Huang et al. |
| 8,446,248 | B2 | 5/2013 | Zeine |
| 8,447,234 | B2 | 5/2013 | Cook et al. |
| 8,451,189 | B1 | 5/2013 | Fluhler |
| 8,452,235 | B2 | 5/2013 | Kirby et al. |
| 8,457,656 | B2 | 6/2013 | Perkins et al. |
| 8,461,817 | B2 | 6/2013 | Martin et al. |
| 8,467,733 | B2 | 6/2013 | Leabman |
| 8,497,601 | B2 | 7/2013 | Hall et al. |
| 8,497,658 | B2 | 7/2013 | Von Novak et al. |
| 8,552,597 | B2 | 8/2013 | Song et al. |
| 8,558,661 | B2 | 10/2013 | Zeine |
| 8,560,026 | B2 | 10/2013 | Chanterac |
| 8,604,746 | B2 | 12/2013 | Lee |
| 8,614,643 | B2 | 12/2013 | Leabman |
| 8,621,245 | B2 | 12/2013 | Shearer et al. |
| 8,626,249 | B2 | 1/2014 | Kuusilinna et al. |
| 8,629,576 | B2 | 1/2014 | Levine |
| 8,653,966 | B2 | 2/2014 | Rao et al. |
| 8,674,551 | B2 | 3/2014 | Low et al. |
| 8,686,685 | B2 | 4/2014 | Moshfeghi |
| 8,686,905 | B2 | 4/2014 | Shtrom |
| 8,712,355 | B2 | 4/2014 | Black et al. |
| 8,712,485 | B2 | 4/2014 | Tam |

(56) References Cited

U.S. PATENT DOCUMENTS

| | | |
|---|---|---|
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,259 B1 | 12/2018 | Leabman |
| 10,164,478 B2 | 12/2018 | Leabman |
| 10,170,917 B1 | 1/2019 | Bell et al. |
| 10,186,892 B2 | 1/2019 | Hosseini et al. |
| 10,193,396 B1 | 1/2019 | Bell et al. |
| 10,199,835 B2 | 2/2019 | Leabman |
| 10,199,849 B1 | 2/2019 | Bell |
| 10,205,239 B1 | 2/2019 | Contopanagos et al. |
| 10,223,717 B1 | 3/2019 | Bell |
| 10,224,982 B1 | 3/2019 | Leabman |
| 2001/0027876 A1 | 10/2001 | Tsukamoto et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0072784 A1 | 6/2002 | Sheppard et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0130425 A1 | 7/2004 | Dayan et al. |
| 2004/0130442 A1 | 7/2004 | Breed |
| 2004/0142733 A1 | 7/2004 | Parise |

(56) References Cited

U.S. PATENT DOCUMENTS

| | | |
|---|---|---|
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1* | 9/2007 | Greene ............... H02J 7/0045 343/700 MS |
| 2007/0228833 A1 | 10/2007 | Stevens et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1* | 12/2009 | Nitzan ............ G06K 19/07749 235/492 |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |

(56) References Cited

U.S. PATENT DOCUMENTS

| | | |
|---|---|---|
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |

(56) References Cited

U.S. PATENT DOCUMENTS

| | | |
|---|---|---|
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Myabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |

(56) References Cited

U.S. PATENT DOCUMENTS

| | | |
|---|---|---|
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | EK et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |

(56) References Cited

U.S. PATENT DOCUMENTS

| | | |
|---|---|---|
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | IM et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0238365 A1 | 8/2016 | Wixey et al. |
| 2016/0240908 A1 | 8/2016 | Strong |
| 2016/0294225 A1 | 10/2016 | Blum et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |

(56) References Cited

U.S. PATENT DOCUMENTS

| | | | |
|---|---|---|---|
| 2017/0077736 A1 | 3/2017 | Leabman | |
| 2017/0077764 A1 | 3/2017 | Bell et al. | |
| 2017/0077765 A1 | 3/2017 | Bell et al. | |
| 2017/0077995 A1 | 3/2017 | Leabman | |
| 2017/0085112 A1 | 3/2017 | Leabman et al. | |
| 2017/0085120 A1 | 3/2017 | Leabman et al. | |
| 2017/0085127 A1 | 3/2017 | Leabman | |
| 2017/0085437 A1 | 3/2017 | Condeixa et al. | |
| 2017/0092115 A1 | 3/2017 | Sloo et al. | |
| 2017/0104263 A1 | 4/2017 | Hosseini | |
| 2017/0110887 A1 | 4/2017 | Bell et al. | |
| 2017/0110888 A1 | 4/2017 | Leabman | |
| 2017/0110889 A1 | 4/2017 | Bell | |
| 2017/0110914 A1 | 4/2017 | Bell | |
| 2017/0127196 A1 | 5/2017 | Blum et al. | |
| 2017/0134686 A9 | 5/2017 | Leabman | |
| 2017/0163076 A1 | 6/2017 | Park et al. | |
| 2017/0168595 A1 | 6/2017 | Sakaguchi et al. | |
| 2017/0179763 A9 | 6/2017 | Leabman | |
| 2017/0179771 A1 | 6/2017 | Leabman | |
| 2017/0187198 A1 | 6/2017 | Leabman | |
| 2017/0187222 A1 | 6/2017 | Hosseini | |
| 2017/0187223 A1 | 6/2017 | Hosseini | |
| 2017/0187224 A1 | 6/2017 | Hosseini | |
| 2017/0187228 A1 | 6/2017 | Hosseini | |
| 2017/0187247 A1 | 6/2017 | Leabman | |
| 2017/0187248 A1 | 6/2017 | Leabman | |
| 2017/0187422 A1 | 6/2017 | Hosseini | |
| 2017/0338695 A1 | 11/2017 | Port | |
| 2018/0040929 A1* | 2/2018 | Chappelle | H02J 7/0047 |
| 2018/0048178 A1 | 2/2018 | Leabman | |
| 2018/0123400 A1 | 5/2018 | Leabman | |
| 2018/0131238 A1 | 5/2018 | Leabman | |
| 2018/0159355 A1 | 6/2018 | Leabman | |
| 2018/0166924 A1 | 6/2018 | Hosseini | |
| 2018/0166925 A1 | 6/2018 | Hosseini | |
| 2018/0198199 A1 | 7/2018 | Hosseini | |
| 2018/0212474 A1 | 7/2018 | Hosseini | |
| 2018/0226840 A1 | 8/2018 | Leabman | |
| 2018/0241255 A1 | 8/2018 | Leabman | |
| 2018/0248409 A1 | 8/2018 | Johnston | |
| 2018/0262014 A1 | 9/2018 | Bell | |
| 2018/0262040 A1 | 9/2018 | Contopanagos | |
| 2018/0262060 A1 | 9/2018 | Johnston | |
| 2018/0269570 A1 | 9/2018 | Hosseini | |
| 2018/0287431 A1 | 10/2018 | Liu et al. | |
| 2018/0331429 A1 | 11/2018 | Kornaros | |
| 2018/0331581 A1 | 11/2018 | Hosseini | |
| 2018/0337534 A1 | 11/2018 | Bell et al. | |
| 2018/0375340 A1 | 12/2018 | Bell et al. | |
| 2018/0375368 A1 | 12/2018 | Leabman | |
| 2018/0376235 A1 | 12/2018 | Leabman | |

FOREIGN PATENT DOCUMENTS

| | | |
|---|---|---|
| CN | 203826555 U | 9/2014 |
| CN | 104090265 A | 10/2014 |
| CN | 103380561 B | 9/2017 |
| DE | 200216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| GB | 2404497 A | 2/2005 |
| JP | 2006157586 A | 6/2006 |
| JP | 2007043432 A | 2/2007 |
| JP | 2008167017 A | 7/2008 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.

(56) References Cited

OTHER PUBLICATIONS

Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp.,IPRP, PCT/US2014/040697, Dec. 8. 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP , PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP , PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2016/069313 Nov. 13, 2017, 10 pgs.
Energous Corp., IPRP , PCT/US2016/069313 Jul. 3, 2018, 7 pgs.
Energous Corp., ISRWO , PCT/US2014/044810 Oct. 21, 2014, 12 pgs.
Energous Corp., IPRP , PCT/US2014/044810, Jan. 5, 2016, 10 pgs.
Energous Corp., ISRWO , PCT/US2015/067271, Mar. 11, 2016, 6 pgs.
Energous Corp., IPRP , PCT/US2015/067271, Jul. 4, 2017, 5 pgs.
Energous Corp., ISRWO , PCT/US2014/040648, Oct. 10, 2014, 11 pgs.
Energous Corp., IPRP , PCT/US2014/040648, Dec. 8, 2015, 8 pgs.
Energous Corp., ISRWO , PCT/US2014/049673, Nov. 18, 2014, 10 pgs.
Energous Corp., IPRP , PCT/US2014/049673, Feb. 9, 2016, 6 pgs.
Energous Corp., ISRWO , PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., IPRP, PCT/US2016/068504, Jun. 26, 2018, 5 pgs.
Energous Corp., ISRWO, PCT/US2016/068495, Mar. 30, 2017, 9 pgs.
Energous Corp., IPRP, PCT/US2016/068495, Jun. 26, 2018, 7 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., IPRP, PCT/US2016/068551, Jun. 26, 2018, 6 pgs.
Energous Corp., ISRWO, PCT/US2016/068498, May 17, 2017, 8 pgs.
Energous Corp., IPRP, PCT/US2016/068498, Jun. 26, 2018, 6 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/068565, Mar. 8, 2017, 11 pgs.
Energous Corp., IPRP, PCT/US2016/068565, Jun. 26, 2018, 9 pgs.
Energous Corp., ISRWO, PCT/US2016/068987, May 8, 2017, 10 pgs.
Energous Corp., IPRP, PCT/US2016/068987, Jul. 3, 2018, 7 pgs.
Energous Corp., ISRWO, PCT/US2016/069316 , Mar. 16, 2017, 15 pgs.
Energous Corp., IPRP, PCT/US2016/069316 , Jul. 3, 2018, 12 pgs.
Energous Corp., ISRWO, PCT/US2018/012806 , Mar. 23, 2018, 9 pgs.

(56) References Cited

OTHER PUBLICATIONS

Energous Corp., ISRWO, PCT/US2017/046800 , Sep. 11, 2017, 13 pgs.
Energous Corp., ISRWO, PCT/US2017/065886, Apr. 6, 2018, 13 pgs.
Energous Corp., ISRWO, PCT/US2018/031768, Jul. 3, 2018, 9 pgs.
Order Granting Reexamination Request Control No. 90/013,793 Aug. 31, 2016, 23 pgs.
Ossia Inc. vs Energous Corp., PGR2016-00023-Institution Decision, Nov. 29, 2016, 29 pgs.
Ossia Inc. vs Energous Corp., PGR2016-00024-Institution Decision, Nov. 29, 2016, 50 pgs.
Ossia Inc. vs Energous Corp., PGR2016-00024-Judgement-Adverse, Jan. 20, 2017, 3 pgs.
ReExam Ordered Control No. 90/013,793 Feb. 2, 2017, 8 pgs.
Ossia Inc. vs Energous Corp., Declaration of Stephen B. Heppe in Support of Petition for Post-Grant Review of U.S. Pat. No. 9,124,125, PGR2016-00024, May 31, 2016, 122 pgs.
Ossia Inc. vs Energous Corp., Petition for Post-Grant Review of U.S. Pat. No. 9,124,125, May 31, 2016, 92 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Pat. No. 9,124,125, May 31, 2016, 86 pgs.
Ossia Inc. vs Energous Corp., Declaration of Stephen B. Heppe in Support of Petition for Post-Grant Review of U.S. Pat. No. 9,124,125, PGR2016-00023, May, 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultrawideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.
Energous Corp., ISRWO, PCT/US2018/031786, Aug. 8, 2018, 9 pgs.

\* cited by examiner

SYSTEMS, METHODS, AND DEVICES FOR USING A BATTERY AS AN ANTENNA FOR RECEIVING WIRELESSLY DELIVERED POWER FROM RADIO FREQUENCY POWER WAVES

RELATED APPLICATIONS

This application is a continuation of U.S. application Ser. No. 15/952,097, filed Apr. 12, 2018, which is a continuation of U.S. application Ser. No. 15/785,324, filed Oct. 16, 2017, entitled "Systems, Methods, and Devices for Using a Battery as an Antenna for Receiving Wirelessly Delivered Power from Radio Frequency Power Waves," which claims priority to U.S. Provisional Patent Application No. 62/570,542, filed Oct. 10, 2017, entitled "Systems, Methods, And Devices For Using A Battery As An Antenna For Receiving Wirelessly Delivered Power From Radio Frequency Power Waves," each of which is herein fully incorporated by reference in its respective entirety.

TECHNICAL FIELD

The present disclosure relates generally to wireless power transmission, and more particularly, to systems and methods for using one or more component(s) of a battery as an antenna for receiving wirelessly delivered power from radio frequency (RF) power waves.

BACKGROUND

Portable electronic devices, such as laptop computers, mobile phones, tablets, and other electronic devices, require frequent charging of a power-storing component (e.g., a battery) to operate. Many electronic devices require charging one or more times per day. Often, charging an electronic device requires manually connecting an electronic device to an outlet or other power source using a wired charging cable. In some cases, a power-storing component, e.g., a battery, is removed from an associated electronic device and inserted into charging equipment to charge. Such charging is inefficient because it often requires users to carry around multiple charging cables and/or other charging devices, and requires users to locate appropriate power sources, e.g., wall outlets, to charge their electronic devices. Additionally, conventional charging techniques potentially deprive a user of the ability to use the device while it is charging, and/or require the user to remain next to a wall outlet or other power source to which their electronic device or other charging equipment is connected.

One way to address this issue is to wirelessly transmit power to an electronic device. Building a wireless charging system for consumer devices typically requires complicated, and often, expensive antenna components to receive wirelessly delivered power in the consumer devices. Many of these consumer devices are also very small without any spare space for added antenna components. Further, due to the size of existing antennas and ever decreasing size of consumer electronic devices, the number of antennas that can be included in an array of antennas in such consumer devices is limited. As such, it would be desirable to provide a wireless charging system that addresses the above-mentioned drawbacks by using existing components of consumer electronic devices as antennas for the receipt of wirelessly delivered power.

SUMMARY

There is a need for a wireless charging system, in particular a wireless power receiving system that is compatible with the limited space of the electronic device, to help address the shortcomings of conventional charging systems described above. In particular, there is a need for a wireless power receiving system that can use one or more existing components in the electronic device to receive wireless power waves. As such, repurposing existing components of electronic devices (e.g., metal battery terminal(s) and/or a metal battery housing) in accordance with some of the embodiments described herein helps to lower costs and system complexity while building more effective wireless charging systems. In some cases, utilizing existing components lowers production and manufacturing costs for wireless power receivers, enables development of smaller and more compact wireless power receivers, and is more convenient to users. As one example, one or more components of a battery (e.g., metal components of the battery) that is part of an electronic device may be used as receiving antennas for various wireless applications, such as wireless charging (e.g., far-range, medium-range, and near-field charging systems). As one example, a method of wirelessly charging an electronic device may include repurposing one or more terminal(s) and/or a battery housing of a battery coupled to the electronic device to receive wireless power waves, and energy from those power waves is then harvested and converted by power conversion circuitry into usable electricity for powering or charging the electronic device.

(A1) In some embodiments, a wireless power receiver configured to receive wirelessly delivered power, comprises two terminals of a battery that supplies power to an electronic device that includes the wireless power receiver, the two terminals including a positive terminal and a negative terminal. At least one of the two terminals configured to act as an antenna to wirelessly receive radio frequency (RF) power signals. The wireless power receiver further comprises power conversion circuitry having an input and an output. The input of the power conversion circuitry is electrically coupled to the at least one of the two terminals of the battery. The power conversion circuitry is configured to convert alternating current (AC) generated by reception of the received RF power signals into a direct current (DC) voltage. The wireless power receiver further comprises a first inductor coupled between the positive terminal and charging circuitry of the electronic device, and a second inductor coupled between the negative terminal and the charging circuitry. The first inductor and the second inductor are configured to block alternating current generated by reception of the received RF power signals from being received by the charging circuitry. In some embodiments, the first and second inductors are not included in the wireless power receiver. The charging circuitry is coupled to (a) the positive terminal and the negative terminal of the battery, (b) the output of the power conversion circuitry, and (c) the electronic device. The charging circuitry is configured to (1) charge the battery using the DC voltage received from the output of the power conversion circuitry, and (2) provide usable power received from the battery to the electronic device.

(A2) In some embodiments of the wireless power receiver of A1, the input of the power conversion circuitry is coupled with the positive terminal via a first connection, and the input of the power conversion circuitry is coupled with the negative terminal via a second connection.

(A3) In some embodiments of the wireless power receiver of A2, the first connection includes a first capacitor, the second connection includes a second capacitor, and the first and the second capacitors are configured to collect an additional DC voltage (distinct from the DC voltage that is converted using the AC generated by reception of the RF power signals) that is drained from the battery (e.g., the additional DC voltage is drained by the charging circuitry to provide power to an electronic device) to prevent the additional DC voltage from being received by the power conversion circuitry.

(A4) In some embodiments of the wireless power receiver of any of A1-A3, the charging circuitry is configured to measure a charge state. Based on the charge state of the battery, the charging circuitry is configured to determine an amount of the DC voltage to provide to the battery during the charging of the battery using the DC voltage.

(A5) In some embodiments of the wireless power receiver of any of A1-A4, the wireless power receiver further comprises impedance matching circuitry coupled between the power conversion circuitry and the first and the second capacitors. The impedance matching circuitry is configured adjust, in accordance with a determination that the charge state of the battery indicates that the battery is substantially full, an impedance of the impedance matching circuitry to substantially block transfer of AC generated by reception of the received RF power signals from the battery to the power conversion circuitry.

(A6) In some embodiments of the wireless power receiver of any of A1-A5, while the charge state of the battery indicates that the battery is not full, the impedance matching circuitry is further configured to dynamically adjust the impedance of the impedance matching circuitry to match an impedance of the battery to ensure that energy from the RF power signals flow to the power conversion circuitry.

(A7) In some embodiments of the wireless power receiver of A1, the wireless power receiver further comprises a connection between the at least one terminal and the power conversion circuitry. The connection includes a capacitor configured to block an additional DC voltage (e.g., the additional DC voltage is discharged by the battery and provided to the charging circuitry for use in power an electronic device) from being received by the power conversion circuitry.

(A8) In some embodiments of the wireless power receiver of A7, the wireless power receiver further comprises impedance matching circuitry coupled between the power conversion circuitry and the capacitor. The charging circuitry is further configured to measure a charge state of the battery; and based on the charge state of the battery, determine an amount of the DC voltage to provide to the battery during the charging of the battery using the DC voltage. The impedance matching circuitry is configured to adjust, in accordance with a determination that the charge state of the battery is substantially full (e.g., the battery has a charge level that is 95%-100% of its maximum capacity), an impedance of the impedance matching circuitry to substantially block transfer of alternating current generated by reception of the received RF power signals from the battery to the power conversion circuitry.

(A9) In some embodiments of the wireless power receiver of any of A1-A8, the electronic device further includes a communication radio that operates on a first frequency band that is distinct from a second frequency band at which the RF power signals are received by the wireless power receiver.

(A10) In some embodiments of the wireless power receiver of A9, the first frequency band has a center frequency of approximately 2.4 GHz and the second frequency band has a center frequency of approximately 900 MHz or 5.8 GHz.

(A11) In some embodiments of the wireless power receiver of any of A1-A10, the battery is a Lithium-ion battery.

(A12) In some embodiments of the wireless power receiver of any of A1-A11, the electronic device is (i) an item-finding device that is configured to indicate a location of an associated item to a user, or (ii) a home automation remote that is configured to control features of a user's home.

(A13) In some embodiments of the wireless power receiver of any of A1-A12, the power conversion circuitry includes a rectifier and a converter.

(B1) In one other aspect, a method of receiving wirelessly delivered power is provided. The method is performed at a wireless power receiver includes (1) two terminals of a battery that supplies power to an electronic device that includes the wireless power receiver, the two terminals including a positive terminal and a negative terminal, and (2) power conversion circuitry having an output coupled to charging circuitry of the electronic device and an input coupled to at least one of the terminals of the battery. The wireless power receiver may further include characteristics described above in A1-A13. The method comprises receiving radio frequency (RF) power signals by at least a part of the battery, providing alternating current (AC) generated by reception of the received RF power signals to the power conversion circuitry, converting, at the power conversion circuitry, the alternating current (AC) into direct current (DC) voltage, and providing the DC voltage from the power conversion circuitry to the charging circuitry configured to charge the battery using the DC voltage.

(B2) In some embodiments of the method of B1, the wireless power receiver further comprises a first inductor coupled between the positive terminal and the charging circuitry, and a second inductor coupled between the negative terminal and the charging circuitry. The method further comprises blocking, via the first and the second inductors, alternating current generated by reception of the received RF power signals from being received by the charging circuitry.

(B3) In some embodiments of the method of any of B1-B2, the wireless power receiver further comprises a first capacitor coupled between the positive terminal and the power conversion circuitry, and a second capacitor coupled between the negative terminal and the power conversion circuitry. The method further comprises collecting an additional DC voltage (e.g., the additional DC voltage is discharged by the battery to provide power to an electronic device) to prevent the additional DC voltage from being received by the power conversion circuitry (B4) In some embodiments of the method of B3, the wireless power receiver further comprises an impedance matching circuitry coupled between the power conversion circuitry and the first and second capacitors. The charging circuitry is further configured to measure a charge state of the battery. The method further comprises adjusting, in accordance with a determination that the charge state of the battery indicates that the battery is substantially full (e.g., the battery has a charge level that is 95%-100% of its maximum capacity), an impedance of the impedance matching circuitry to substantially block transfer of alternating current generated by reception of the received RF power signals from the battery to the power conversion circuitry.

(B5) In some embodiments of the method of B4, the method further comprises adjusting, in accordance with a determination that the charge state of the battery indicates that the battery is not full, the impedance of the impedance matching circuitry to match an impedance of the battery to ensure that energy from the RF power signals flow to the power conversion circuitry.

(B6) In some embodiments of the method of any of B1-B5, the electronic device further includes a communication radio that operates on a first frequency band that is distinct from a second frequency band at which the RF power signals are received by the wireless power receiver.

(B7) In some embodiments of the method of any of B1-B6, the at least a part of the battery acting as an antenna comprises at least one terminal of the battery and/or a battery housing.

(C1) In yet another aspect, an electronic device is provided and the electronic device includes a wireless power receiver as described in any one of A1-A13. The electronic device includes a battery having two terminals including a positive terminal and a negative terminal. The battery is configured to (1) supply power to the electronic device; and (2) act, via at least one of the two terminals, as an antenna to wirelessly receive, radio frequency (RF) power signals. The electronic device further includes power conversion circuitry having an input and an output. The input electrically is coupled to the at least one of the terminals of the battery. The power conversion circuitry is configured to convert energy (e.g., alternating current generated by reception of the RF power signals) of the harvested RF power signals into a direct current (DC) voltage. The electronic device further includes charging circuitry electrically coupled to (a) the positive terminal and the negative terminal of the battery, and (b) the output of the power conversion circuitry. The charging circuitry is configured to: (1) charge the battery using the DC voltage received from the output of the power conversion circuitry; and (2) provide usable power received from the battery to the electronic device. The electronic device further includes a first inductor coupled between the positive terminal and charging circuitry of the electronic device, and a second inductor coupled between the negative terminal and the charging circuitry. The first inductor and the second inductor are configured to block alternating current generated by reception of the received RF power signals from being received by the charging circuitry.

(E1) In some embodiments, a wireless power receiver configured to receive wirelessly delivered power, comprises at least one battery having at least two battery terminals including a battery positive terminal and a battery negative terminal. At least a part of the battery configured to act as an antenna that wirelessly receives radio frequency (RF) power signals. The wireless power receiver further comprises power conversion circuitry having at least one connector electrically coupled to at least one of the at least two battery terminals. The power conversion circuitry is configured to convert an alternating current (AC) generated by reception of RF power signals received at the at least one battery into a direct current (DC) voltage. The wireless power receiver further comprises charging circuitry having at least two charging circuit terminals, including a charging circuit positive terminal electrically coupled to the battery positive terminal via a first inductor, and a charging circuit negative terminal electrically coupled to the battery negative terminal via a second inductor. The first inductor and the second inductor are configured to block alternating current generated by reception of the RF power signals received at the battery from being received by the charging circuitry. The charging circuitry is electrically coupled to the power conversion circuitry and the charging circuitry is configured to (i) receive the DC voltage from the power conversion circuitry and (ii) charge the at least one battery using the DC voltage.

(E2) In some embodiments of the wireless power receiver of E1, the at least one connector of the power conversion circuitry comprises a power conversion circuitry first terminal electrically coupled with the battery positive terminal via a first electrical connection; and a power conversion circuitry second terminal electrically coupled with the battery negative terminal via a second electrical connection.

(E3) In some embodiments of the wireless power receiver of E2, the charging circuitry drains an additional DC voltage from the at least one battery and provides the additional direct current to an electronic device in which the wireless power receiver is embedded. The first electrical connection includes a first capacitor. The second electrical connection includes a second capacitor. The first and the second capacitors are configured to prevent the additional DC voltage from being received by the power conversion circuitry.

(E4) In some embodiments of the wireless power receiver of any of E1-E3, the charging circuitry is configured to measure a charge state of the at least one battery. Based on the charge state of the at least one battery, the charging circuitry is configured to determine an amount of the DC voltage to provide to the battery during the charging of the battery using the DC voltage.

(E5) In some embodiments of the wireless power receiver of any of E1-E4, the wireless power receiver further comprises impedance matching circuitry coupled between the power conversion circuitry and the first and the second capacitors. The impedance matching circuitry is configured to adjust, in accordance with a determination that the charge state of the at least one battery indicates that the battery is substantially full, an impedance of the impedance matching circuitry to substantially block flow of the alternating current generated by reception of the received RF power signals from the battery to the power conversion circuitry.

(E6) In some embodiments of the wireless power receiver of any of E1-E5, while the charge state of the battery indicates that the at least one battery is not substantially full, the impedance matching circuitry is further configured to dynamically adjust the impedance of the impedance matching circuitry to match an impedance of the at least one battery to ensure that the alternating current flows to the power conversion circuitry.

(E7) In some embodiments of the wireless power receiver of E1, the charging circuitry drains an additional DC voltage from the at least one battery and provides the additional direct current to an electronic device in which the wireless power receiver is embedded. The at least one connector of the power conversion circuitry comprises a power conversion circuitry terminal electrically coupled via an electrical connection with one of: (i) the battery positive terminal and (ii) the battery negative terminal. The electrical connection includes a capacitor configured to prevent the additional DC voltage from being received by the power conversion circuitry.

(E8) In some embodiments of the wireless power receiver of E7, the wireless power receiver further comprises impedance matching circuitry coupled between the power conversion circuitry and the capacitor. The charging circuitry is further configured to measure a charge state of the at least one battery; and based on the charge state of the at least one battery, determine an amount of the DC voltage to provide to the battery during the charging of the at least one battery using the DC voltage. The impedance matching circuitry is configured to adjust, in accordance with a determination that the charge state of the at least one battery is substantially full, an impedance of the impedance matching circuitry to substantially block transfer of the alternating current to the power conversion circuitry.

(E9) In some embodiments of the wireless power receiver of any of E1-E8, the electronic device further includes a communication radio that operates on a first frequency band that is distinct from a second frequency band at which the RF power signals are received by the wireless power receiver.

(E10) In some embodiments of the wireless power receiver of any of E1-E9, the electronic device is (i) an item-finding device that is configured to indicate a location of an associated item to a user, or (ii) a home automation remote that is configured to control features of a user's home.

(E11) In some embodiments of the wireless power receiver of any of E1-E10, the at least a part of the battery that is acting as the antenna comprises at least one of the at least two battery terminals, and/or a housing of the at least one battery.

(F1) In some embodiments, a wireless power receiver comprises a first connection with a battery. The first connection is configured to receive an alternating current (AC) that is generated by reception of wirelessly delivered radio frequency (RF) power signals. The RF power signals are received by at least a part of the battery that is acting as an antenna. The wireless power receiver further comprises power conversion circuitry that is electrically coupled to the first connection with the battery, wherein the power conversion circuitry is configured to convert the alternating current into a direct current (DC) voltage that is used to charge the battery.

(F2) In some embodiments of the wireless power receiver of F1, the wireless power receiver further comprises a second connection, distinct from the first connection, between the power conversion circuitry and charging circuitry, wherein the charging circuitry is electrically coupled with the battery via a third connection, distinct from the first and second connections. The third connection includes at least one inductor that is configured to block the alternating current from being received by the charging circuitry. The charging circuitry is configured to receive the DC voltage via the second connection, and use the third connection to charge the battery using the DC voltage.

(F3) In some embodiments of the wireless power receiver of any of F1-F2, the wireless power receiver further comprises impedance matching circuitry coupled between the power conversion circuitry and the battery. The impedance matching circuitry is configured to adjust, in accordance with a determination that a charge state of the battery indicates that the battery is substantially full, an impedance of the impedance matching circuitry to substantially block flow of the alternating current to the power conversion circuitry.

(F4) In some embodiments of the wireless power receiver of any of F1-F3, the charge state of the battery is determined by the charging circuitry.

(F5) In some embodiments of the wireless power receiver of any of F1-F4, at least one capacitor that is situated between the impedance matching circuitry and the battery. The charging circuitry drains an additional DC voltage from the battery to provide power to an electronic device. The at least one capacitor is configured to substantially prevent the additional DC voltage from flowing to the power conversion circuitry.

(F6) In some embodiments of the wireless power receiver of any of F1-F5, the wireless power receiver is embedded in the electronic device.

(F7) In some embodiments of the wireless power receiver of any of F1-F6, the part of the battery that is acting as the antenna comprises at least one terminal of the battery and/or a housing of the battery.

(D1) In still another aspect, a non-transitory computer-readable storage medium is provided. The non-transitory computer-readable storage medium stores executable instructions that, when executed by a wireless power receiver (as described in any one of A1-A13, E1-E11, or F1-F7) with one or more processors/cores, cause the wireless power receiver to perform the method described in any one of B1-B7.

(G1) In yet another aspect, an electronic device that includes a wireless power receiver is provided. The electronic device comprises a battery that is configured to provide power to the electronic device. The electronic device also comprises a wireless power receiver embedded in the electronic device. The wireless power receiver includes a first connection with a battery. The first connection is configured to receive an alternating current that is generated by reception of wirelessly delivered radio frequency (RF) power signals. The RF power signals are received by at least a part of the battery that is acting as an antenna. The wireless power receiver further includes power conversion circuitry that is electrically coupled to the first connection with the battery. The power conversion circuitry is configured to convert the alternating current into a direct current (DC) voltage that is used to charge the battery.

(G2) In some embodiments of the electronic device of G1, the electronic device further comprises charging circuitry that is electrically coupled with the battery. The wireless power receiver also includes a second connection, distinct from the first connection, between the power conversion circuitry and the charging circuitry. The charging circuitry is electrically coupled with the battery via a third connection, distinct from the first and second connections. The third connection includes at least one inductor that is configured to block the alternating current from being received by the charging circuitry. The charging circuitry is configured to receive, via the second connection, the DC voltage, and to use the third connection to charge the battery using the DC voltage.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
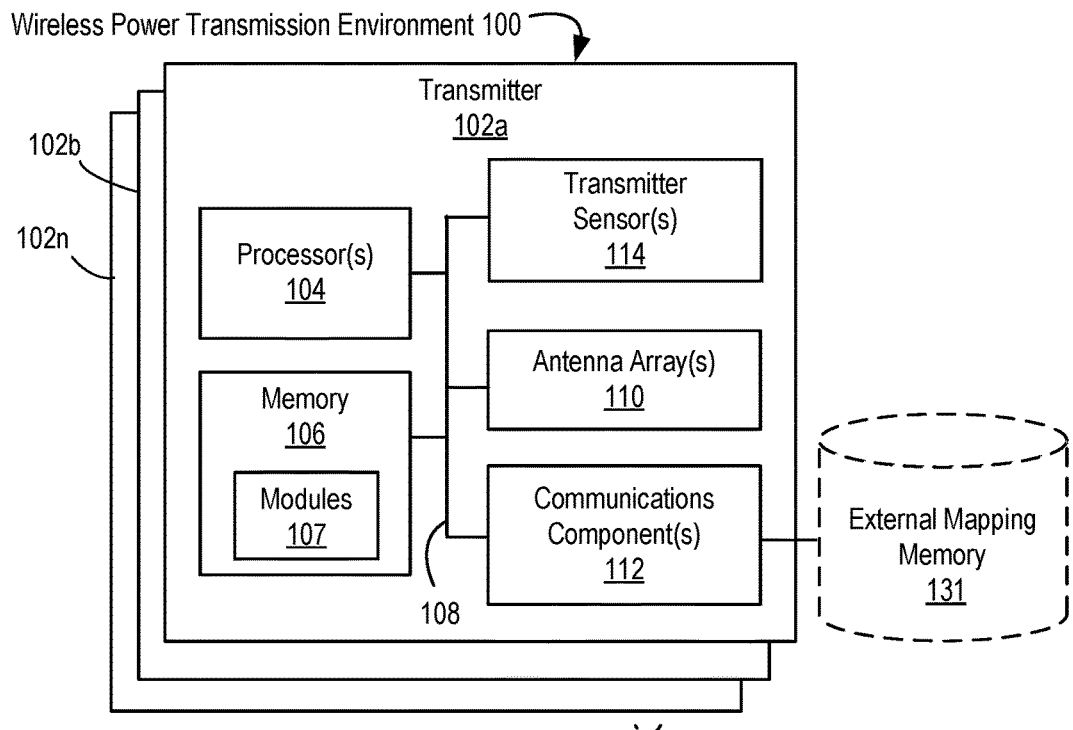
FIG. 1 is a block diagram of components of a representative wireless power transmission system or environment, in accordance with some embodiments.
Figure 1:
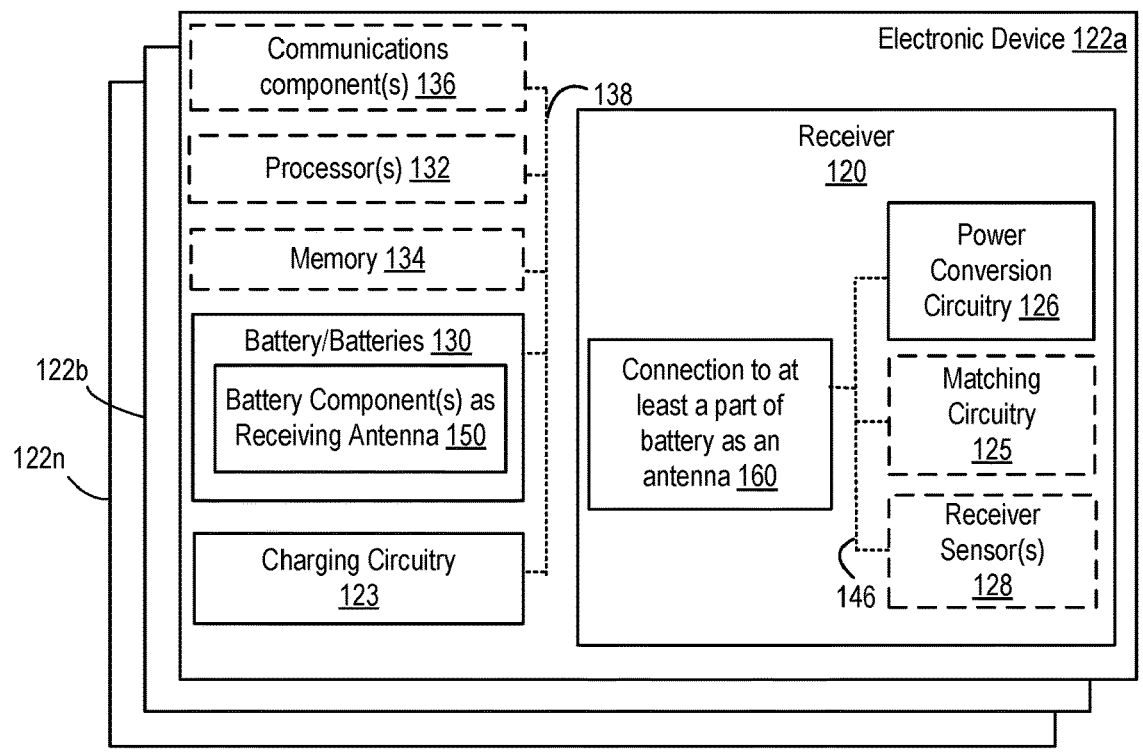

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

For the sake of brevity, the following detailed description describes embodiments directed at an electronic device that includes a battery for powering the device. The battery includes two or more terminals as electrical contacts configured to conduct electricity that flows into and out of the battery. One or more terminals of the battery are repurposed to also receive energy from wireless power waves (also referred to interchangeably herein as power signals, power waves, or power transmission waves). Repurposing an existing terminal of the battery to serve the additional power receiving function eliminates the need for a separate antenna for receiving wireless power waves. As used herein, "repurposing" of the one or more terminals means using the one or more terminals for an additional purpose, i.e., in addition to its intended purpose (e.g., its intended purpose of conducting electric current into and/or out of the battery).

FIG. 1 is a block diagram of components of wireless power transmission environment 100, in accordance with some embodiments. Wireless power transmission environment 100 includes, for example, transmitters 102 (e.g., transmitters 102a, 102b . . . 102n) and one or more receivers 120 (also referred to interchangeably herein as a wireless power receiver 120). In some embodiments, wireless power transmission environment 100 includes a number of receivers 120, each of which is associated with a respective electronic device 122 (e.g., electronic devices 122a, 122b . . . 122n). In some embodiments, a respective electronic device 122 includes a battery 130 for powering various functions of the respective electronic device 122. Battery 130 includes one or more battery terminals 150 that are repurposed to also operate as receiving antenna(s) for a respective receiver 120.

An example transmitter 102 (e.g., transmitter 102a) includes, for example, one or more processor(s) 104, a memory 106, one or more antenna arrays 110, one or more communications components 112, and/or one or more transmitter sensors 114. In some embodiments, these components are interconnected by way of a communications bus 108. References to these components of transmitters 102 cover embodiments in which one or more than one of each of these components (and combinations thereof) are included.

In some embodiments, memory 106 stores one or more programs (e.g., sets of instructions) and/or data structures, collectively referred to as "modules" herein. In some embodiments, memory 106, or the non-transitory computer readable storage medium of memory 106 stores the following modules 107 (e.g., programs and/or data structures), or a subset or superset thereof:

information received from receiver 120 (e.g., generated by receiver sensor(s) 128 and received via communication signals 118);

information received from transmitter sensor 114;

an adaptive pocket-forming module that adjusts one or more power waves 116 transmitted by one or more transmitters 102; and/or a beacon transmitting module that transmits a communication signal 118 for detecting a receiver 120 (e.g., within a transmission field of the one or more transmitters 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, memory 106 stores a subset of the modules identified above. In some embodiments, an external mapping memory 131 that is communicatively connected to communications component 112 stores one or more modules identified above. Furthermore, the memory 106 and/or external mapping memory 131 may store additional modules not described above. In some embodiments, the modules stored in memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to memory 106 is implemented on memory 104 of a server (not shown) that is communicatively coupled to one or more transmitters 102 and/or by a memory of electronic device 122 and/or receiver 120.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of waves 116 by antenna array 110), one or more communications component processors (configured to, e.g., control communications transmitted by communications component 112 and/or receive communications via communications component 112) and/or one or more sensor processors (configured to, e.g., control operation of transmitter sensor 114 and/or receive output from transmitter sensor 114).

In some embodiments, electronic device 122a includes receiver 120 configured to receive transmission power waves 116 and convert the transmission power waves 116 into usable energy. In some embodiments, electronic device 122a further includes battery 130 and charging circuitry 123. In some embodiments, charging circuitry 123 is configured to receive the usable energy from receiver 120 to charge battery 130. Optionally, electronic device 122a further includes processor(s) 132, memory 134, and/or communication component(s) 136 that are interconnected by way of a communications bus 138.

In some embodiments, receiver 120 (e.g., a wireless power receiver of electronic device 122) receives power signals 116 and/or communications 118 transmitted by transmitters 102. In some embodiments, receiver 120 includes a connection 160 (e.g., connection 214 of FIG. 2) to at least a part of battery 130, at least a component of which is acting as one or more antennas for receiving power signals 116. In some embodiments, the one or more antennas include one or more repurposed terminals of a battery (e.g., battery terminal(s) 150 repurposed as receiving antenna(s)). In some embodiments, a battery housing (e.g., a metallic battery housing 208, FIG. 2) may also be repurposed to operate as one or more of the one or more antennas. In some embodiments, upon reception of wirelessly delivered RF power signals at the one or more antennas, electrons in the conductors of the one or more antennas are excited to generate oscillating current (e.g., alternating current) to flow in the receiving circuit.

In some embodiments, receiver 120 further includes power conversion circuitry 126. Optionally, receiver 120 includes matching circuitry 125 (also referred to interchangeably herein as impedance matching circuitry 125), receiver sensor(s) 128 and/or other components or circuitry. In some embodiments, receiver 120 converts energy from received waves 116 (e.g., RF power waves) into electrical energy to power and/or charge electronic device 122. For example, receiver 120 uses power conversion circuitry 126 to convert energy (e.g., alternating current (AC) electricity) generated by reception of captured RF signals from power waves 116 to direct current (DC) electricity (e.g., DC voltage) that is usable to power and/or charge electronic device 122 (e.g., to charge battery 130 of electronic device 122). Non-limiting examples of power conversion circuitry 126 include rectifiers, rectifying circuits, power converters, power management integrated circuits (PMIC), voltage conditioners, among suitable circuitry and devices. References are made herein to RF signals (or RF power signals, or RF power waves), and these references refer to wireless electromagnetic signals used as a form of communication. RF signals are transmitted from a wireless power transmitter, and then received by an antenna of a wireless receiving device. The oscillating electric and magnetic fields of the RF signals exert force on the electrons in the conductors of the antenna to generate oscillating current (e.g., an alternating current) to flow in the receiving circuit.

In some embodiments, receiver 120 is a component of electronic device 122. For example, processor(s) 132 controls functions of electronic device 122 and receiver 120. In some embodiments, receiver 120 is a standalone device that is detachably coupled to one or more electronic devices 122. In this case, receiver antenna(s) may include wires connected to or extended from battery terminal(s) 150 of battery 130 and/or a metal housing of the battery 130. In some embodiments, electronic device 122 has processor(s) 132 for controlling one or more functions of electronic device 122 and receiver 120 has processor(s) (not shown) for controlling one or more functions of receiver 120.

In some embodiments, electronic device 122 includes processor(s) 132, memory 134, communication component(s) 136, battery/batteries 130, and/or charging circuitry 123. In some embodiments, these components are interconnected by way of a communications bus 138. In some embodiments, communications between electronic device 122 and receiver 120 occur via communications component(s) 136 of electronic device 122 and/or communications component(s) (not shown) of receiver 120. In some embodiments, communications between electronic device 122 and receiver 120 occur via a wired connection between communications bus 138 and communications bus 146. In some embodiments, electronic device 122 and receiver 120 share a single communications bus. In some embodiments, communication signals 118 received from transmitter 102 are received by communication component(s) 136 of electronic device 122. In some embodiments, communication component(s) 136 of electronic device 122 operate on a frequency band (e.g., having a center frequency of approximately 2.4 GHz) that is distinct from a frequency band (e.g., having a center frequency of approximately 900 MHz or 5.8 GHz) at which the RF power signals 116 are received by wireless power receiver 120.

In some embodiments, receiver 120 receives one or more power waves 116 directly from transmitter 102. In some embodiments, receiver 120 harvests power waves from one or more pockets of energy created by one or more power waves 116 transmitted by transmitter 102.

In some embodiments, battery 130 of electronic device 122 includes two or more terminal(s) 150 (e.g., a positive terminal and a negative terminal). In some embodiments, one or more terminals of battery 130 are configured to receive one or more wireless power waves 116 from transmitter 102. In some embodiments, at least a part of battery 130, such as the battery housing, is used to receive one or more wireless power waves 116. In some embodiments, battery terminal(s) 150 and/or battery housing are made of metal or other types of conductive materials that are capable of conducting electricity. In some embodiments, battery terminal(s) 150 and/or battery housing are electrically connected to a main printed circuit board (PCB) of electronic device 122.

In some embodiments, battery 130 is a rechargeable battery, such as a Lithium-ion battery, a lead-acid battery, a nickel-cadmium (NiCd) battery, a nickel-metal hydride (NiMH) battery, or a lithium-ion polymer (Li-ion polymer). In some embodiments, battery 130 is a coin cell battery (or a flat battery), a cylindrical battery, a button-shaped battery, or a pouch battery. In some embodiments, the size of battery 130 having at least a part that can be used as an antenna is not limited, from small sized batteries (e.g., batteries for hearing aids) to larger batteries (e.g. batteries for cellphones and/or tablets). In some embodiments, at least a part of battery 130 may be used as receiving antennas for various wireless applications, such as wireless communications (e.g., Wi-Fi, Bluetooth, and GSM) and wireless charging (e.g., far-range, medium-range, and near-field charging systems). In some embodiments, the battery 130 is a rechargeable battery 130.

In some embodiments, matching circuitry 125 comprises any combinations of one or more inductive elements and/or one or more capacitive elements that form a circuit. In some embodiments, by tuning the impedance of matching circuitry 125, power transfer (e.g., transfer of alternating current generated by reception of RF power signals) from battery terminal(s) 150 to power conversion circuitry 126 can be substantially blocked or allowed as needed. In some embodiments, the tuning of the impedance of matching circuitry 125 can be achieved using one or more varactor capacitors and/or one or more variable-inductance inductors.

In some embodiments, when battery 130 is being discharged, charging circuitry 123 receives usable energy (e.g., DC voltage) from battery 130 to power one or more functions (e.g., controlled by processor(s) 132) of electronic device 120. In some embodiments, when battery 130 is being charged, charging circuitry 123 provides DC voltage received from power conversion circuitry 126 to battery 130 for charging battery 130. In some embodiments, charging circuitry 123 is configured to measure a charge state of battery 130. In some examples, charging circuitry 123 measures an open circuit voltage (OCV) of battery 130 to estimate the charge state (e.g., a percentage of current charge state relative to a full charge state) of battery 130. In some other examples, because an impedance of battery 130 changes as the charge state of battery 130 changes, charging circuitry 123 measures the impedance of battery 130 to determine the corresponding charge state of battery 130.

In some embodiments, after power waves 116 are received and/or energy is harvested from a concentration or pocket of energy, circuitry (e.g., integrated circuits, amplifiers, rectifiers, and/or voltage conditioner) of receiver 120 converts the energy of the power waves (e.g., radio frequency (RF) electromagnetic radiation) to usable energy (e.g., electricity), which powers electronic device 122 or is stored to battery 130. In some embodiments, a rectifying circuit (also referred to as a rectifier) of the power conversion circuitry 126 translates the electrical energy from AC to DC for use by electronic device 122. In some embodiments, a voltage conditioning circuit (also referred to as a power converter, not shown) included increases or decreases the voltage of the electrical energy as required by battery 130. In some embodiments, an electrical relay (not shown) conveys electrical energy to battery 130.

In some embodiments, receiver 120 is a component of an electronic device 122. In some embodiments, a receiver 120 is coupled (e.g., detachably coupled) to an electronic device 122. In some embodiments, electronic device 122 is a peripheral device of receiver 120. In some embodiments, electronic device 122 obtains power from multiple transmitters 102 and/or using multiple receivers 120. In other embodiments, each transmitter may be assigned to transmit wireless power to a particular electronic device with repurposed wire antenna. In some embodiments, wireless power transmission environment 100 includes a plurality of electronic devices 122, each having at least one respective receiver 120 that is used to harvest power waves from the transmitters 102 into usable power for charging the electronic devices 122.

In some embodiments, receiver 120 discussed herein may be integrated into consumer devices (or electronic devices 122) such as an item-finding device that is configured to indicate a location of an associated item to a user. In some embodiments, another example of electronic device 122 includes a home automation remote that is configured to control features of a user's home. Other examples of electronic devices 122 include wireless earphones, wireless headsets or glasses, mobile phones, laptops, smart watches or other wearable devices, sound bars, televisions, media entertainment systems, light fixtures, electronic keychains, hearing aids, and other devices, to includes respective receivers that remain compact, and aesthetically appealing, yet still capable of receiving power waves sufficient to charge those electronic devices.

In some embodiments, one or more transmitters generate power waves to form pockets of energy at target locations and adjust power wave generation based on sensed data to provide safe, reliable, and efficient wirelessly-delivered power to receivers (and electronic devices associated therewith). In some embodiments, a controlled "pocket of energy" (e.g., a region in which available power is high or concentrated due to constructive interference of power waves) and/or null spaces (e.g., a region in which available power is low or nonexistent due to destructive interference of power waves) may be formed by convergence of the power waves transmitted into a transmission field of the one or more transmitters. In some embodiments, pockets of energy form at one or more locations in a two- or three-dimensional field due to patterns of constructive interference caused by convergences of transmitted power waves. Energy from the transmitted power waves may be harvested by receivers (i.e., received and converted into usable power) at the one or more locations.

In some instances, constructive interference of power waves occurs when two or more power waves 116 are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In some embodiments, destructive interference of power waves occurs when two or more power waves are out of phase and converge into a combined wave such that the amplitude of the combined wave is less than the amplitude of a single one of the power waves. For example, the power waves "cancel one another out," thereby diminishing the amount of energy concentrated at a location in the transmission field. In some embodiments, destructive interference is used to generate a negligible amount of energy or "null" at a location within the transmission field where the power waves converge. In some embodiments, the "null" space is created adjacent to the pockets of energy formed by the constructive interference patterns.

In some embodiments, adaptive pocket-forming is performed, e.g., by adjusting power wave transmission to achieve a target power level for at least some of the power waves transmitted by the one or more transmitters. For example, a system for adaptive pocket-forming includes a sensor. In some embodiments, when the sensor detects an object, such as a sensitive object (e.g., a person, an animal, equipment sensitive to the power waves, and the like) within a predetermined distance (e.g., a distance within a range of 1-5 feet) of a pocket of energy, of one or more of the power waves, or of a transmitter, then a respective transmitter of the one or more transmitters adjusts one or more characteristics of transmitted power waves. Non-limiting examples of the one or more characteristics include: frequency, amplitude, trajectory, phase, and other characteristics used by one or more antennas of the one or more transmitters to transmit the power waves. As one example, in response to receiving information indicating that transmission of power waves by a respective transmitter of the one or more transmitters should be adjusted (e.g., a sensor senses a sensitive object within a predetermined distance of a respective target location), the adaptive pocket-forming process adjusts the one or more characteristics accordingly.

In some embodiments, adjusting the one or more characteristics includes reducing a currently generated power level at a location by adjusting one or more transmitted power waves that converge at the target location. In some embodiments, reducing a currently generated power level includes transmitting a power wave that causes destructive interference with at least one other transmitted power wave. For example, a power wave is transmitted with a first phase that is shifted relative to a second phase of at least one other power wave to destructively interfere with the at least one other power wave in order to diminish or eliminate the currently generated power level at the target location.

In some embodiments, adjusting the one or more characteristics includes increasing a power level for some of the transmitted power waves to ensure that the receiver (e.g., with power harvesting circuitry 120) receives adequate energy sufficient to quickly charge a power-storing component of an electronic device that is associated with the receiver.

In some embodiments, an object is "tagged" (e.g., an identifier of the object is stored in memory in association with a flag) to indicate that the detected object is a sensitive object. In response to detection of a particular object within a predetermined distance of a target location, a determination is made as to whether the particular object is a sensitive object. In some embodiments, this determination includes performing a lookup in the memory to check whether the particular object has been previously tagged and is therefore known as a sensitive object. In response to determining that the particular object is a sensitive object, the one or more characteristics use to transmit the power waves are adjusted accordingly.

In some embodiments, sensing a sensitive object includes using a series of sensor readings from one or more sensors to determine motion of an object within a transmission field of the one or more transmitters. In some embodiments, sensor output from one or more sensors is used to detect motion of the object approaching within a predetermined distance of a pocket of energy or of power waves used to form the pocket of energy. In response to a determination that a sensitive object is approaching (e.g., moving toward and/or within a predefined distance of a pocket of energy), the currently generated power level at the location of the pocket of energy is reduced. In some embodiments, the one or more sensors include sensors that are internal to the one or more transmitters, the receiver, and/or sensors that are external to the one or more transmitters and the receiver and may include thermal imaging, optical, radar, and other types of sensors capable to detecting objects within a transmission field.

Although some embodiments herein include the use of Radio Frequency (RF)-based wave transmission technologies as a primary example, it should be appreciated that the wireless charging techniques that might be employed are not be limited to RF-based technologies and transmission techniques. Rather, it should be appreciated that additional or alternative wireless charging techniques may be utilized, including any suitable technology and technique for wirelessly transmitting energy so that a receiver is capable of converting the transmitted energy to electrical power. Such technologies or techniques may transmit various forms of wirelessly transmitted energy including the following non-limiting examples: ultrasound, microwave, resonant and inductive magnetic fields, laser light, infrared, or other forms of electromagnetic energy.

In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the example receiver system is shown, in some embodiments, as a single unit comprising potentially multiple components, both for RF reception of power and for other power reception methods mentioned in this paragraph, the receiver system can comprise multiple receivers that are physically spread around a room rather than being in a compact regular structure.

In some embodiments, one or more transmitters 102 adjust one or more characteristics (e.g., phase, gain, direction, and/or frequency) of power waves 116. For example, transmitter 102 selects a subset of one or more antenna elements of antenna array 110 to initiate transmission of power waves 116, cease transmission of power waves 116, and/or adjust one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit and/or waveform generator, may control the behavior of the antennas. For example, based on the information received from the receiver via the communications signal 118, a controller circuit may determine a set of one or more characteristics or waveform characteristics (e.g., amplitude, frequency, trajectory, phase, among other characteristics) used for transmitting the power waves 116 that would effectively provide power to the power harvesting circuitry 120 and electronic device 122. The controller circuit may also identify a subset of antennas from the antenna arrays 110 that would be effective in transmitting the power waves 116. As another example, a waveform generator circuit of the respective transmitter 102 coupled to the processor 104 may convert energy and generate the power waves 116 having the waveform characteristics identified by the controller, and then provide the power waves to the antenna arrays 110 for transmission.

In some embodiments, one or more transmitters 102 transmit power waves 116 that create two or more discrete transmission fields (e.g., overlapping and/or non-overlapping discrete transmission fields). In some embodiments, a first transmission field is managed by a first processor 104 of a first transmitter (e.g. transmitter 102a) and a second transmission field is managed by a second processor 104 of a second transmitter (e.g., transmitter 102b). In some embodiments, the two or more discrete transmission fields (e.g., overlapping and/or non-overlapping) are managed by the transmitter processors 104 as a single transmission field.

In some embodiments, communications component 112 transmits communication signals 118 by way of a wired and/or wireless communication connection to receiver 120. In some embodiments, communications component 112 generates communications signals 118 used for triangulation of receiver 120. In some embodiments, communication signals 118 are used to convey information between transmitter 102 and receiver 120 for adjusting one or more characteristics used to transmit the power waves 116. In some embodiments, communications signals 118 include information related to status, efficiency, user data, power consumption, billing, geo-location, relative location, and other types of information. In some embodiments, receiver 120 includes a transmitter (not shown), or is a part of a transceiver, that transmits communications signals 118 to communications component 112 of transmitter 102.

In some embodiments, communications component 112 (e.g., communications component 112 of transmitter 102a) includes a communications component antenna for communicating with receiver 120 and/or other transmitters 102 (e.g., transmitters 102b through 102n). In some embodiments, these communications signals 118 represent a distinct channel of signals transmitted by transmitter 102, independent from a channel of signals used for transmission of the power waves 116.

In some embodiments, receiver 120 includes a receiver-side communications component 136 configured to communicate various types of data with one or more of the transmitters 102, through a respective communications signal 118 generated by the receiver-side communications component. The data may include location indicators for receiver 120 or electronic device 122 associated therewith; a power status of receiver 120 or electronic device 122 associated therewith; status information for receiver 120 or electronic device 122 associated therewith; status information for receiver 120 or electronic device 122 associated therewith; status information about transmission or reception of the power waves 116; and/or status information for pockets of energy. In other words, receiver 120 may provide data to the transmitter 102, via the communications signals 118, regarding the current operation of the power transmission system 100, including: information identifying a present location of receiver 120 or electronic device 122 associated therewith, an amount of energy received by receiver 120, and an amount of power received and/or used by electronic device 122 associated with receiver 120, among other possible data points containing other types of information. In some embodiments, communications signals 118 sent by receiver 120 or a device associated therewith may include data for, e.g., alerting transmitters 102 that receiver 120 or electronic device 122 associated therewith has entered or is about to enter a transmission field, indicate the effectiveness of received power waves 116, and/or provide updated characteristics or transmission parameters that the one or more transmitters 102 may use to adjust transmission of the power waves 116.

In some embodiments, the data contained within communications signals 118 is used by electronic device 122, receiver 120, and/or transmitters 102 for determining adjustments of the one or more characteristics used by the antenna array 110 to transmit the power waves 116. Using a communications signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, receiver 120 uses a communications signal 118 to communicate data for, e.g., alerting transmitters 102 that the receiver 120 has entered or is about to enter a transmission field, provide information about electronic device 122, provide user information that corresponds to electronic device 122, indicate the effectiveness of received power waves 116, and/or provide updated characteristics or transmission parameters that the one or more transmitters 102 use to adjust transmission of the power waves 116.

As an example, communications component 112 of transmitter 102 communicates (e.g., transmits and/or receives) one or more types of data (including, e.g., authentication data and/or transmission parameters) including various information such as a beacon message, a transmitter identifier, a device identifier for an electronic device 122, a user identifier, a charge level for electronic device 122, a location of receiver 120 in a transmission field, and/or a location of electronic device 122 in a transmission field.

In some embodiments, transmitter sensor 114 and/or receiver sensor 128 detect and/or identify conditions of electronic device 122, receiver 120, transmitter 102, and/or a transmission field. In some embodiments, data generated by transmitter sensor 114 and/or receiver sensor 128 is used by transmitter 102 to determine appropriate adjustments to the one or more characteristics used to transmit the power waves 106. Data from transmitter sensor 114 and/or receiver sensor 128 received by transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, receiver sensors 128 include a gyroscope that provides raw data such as orientation data (e.g., tri-axial orientation data), and processing this raw data may include determining a location of receiver 120 and/or a device associated therewith using the orientation data. In some embodiments, receiver sensors 128 include one or more infrared sensors (e.g., that output thermal imaging information), and processing this infrared sensor data includes identifying a person (e.g., indicating presence of the person and/or indicating an identification of the person) or other sensitive object based upon the thermal imaging information. In some embodiments, receiver sensors 128 may further or alternatively include an accelerometer that provides orientation data for receiver 120 and/or a device associated therewith (the received orientation information may be used to determine whether electronic device 122 is lying flat on a table, in motion, and/or in use).

Non-limiting examples of transmitter sensor 114 and/or receiver sensors include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for transmitter sensor 114 and/or receiver sensors include binary sensors that acquire stereoscopic sensor data, such as the location of a human or other sensitive object.

In some embodiments, transmitter sensor 114 and/or a receiver sensor is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, transmitters 102 adjust one or more characteristics used to transmit the power waves 116 to ensure compliance with electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for maximum permissible exposure (MPE), and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In some embodiments, output from transmitter sensor 114 and/or a receiver sensor is used by transmitter 102 to detect whether a person or other sensitive object enters a power transmission region (e.g., a location within a predetermined distance of a transmitter 102, power waves generated by transmitter 102, and/or a pocket of energy). In some embodiments, in response to detecting that a person or other sensitive object has entered the power transmission region, the transmitter 102 adjusts one or more power waves 116 (e.g., by ceasing power wave transmission, reducing power wave transmission, and/or adjusting the one or more characteristics of the power waves). In some embodiments, in response to detecting that a person or other sensitive object has entered the power transmission region, the transmitter 102 activates an alarm (e.g., by transmitting a signal to a loudspeaker that is a component of transmitter 102 or to an alarm device that is remote from transmitter 102). In some embodiments, in response to detecting that a person or other sensitive object has entered a power transmission region, the transmitter 102 transmits a digital message to a system log or administrative computing device.

In some embodiments, antenna array 110 includes multiple antenna elements (e.g., configurable "tiles") collectively forming an antenna array. Antenna array 110 generates, e.g., RF power waves, ultrasonic power waves, infrared power waves, and/or magnetic resonance power waves. In some embodiments, the antennas of an antenna array 110 (e.g., of a single transmitter, such as transmitter 102a, and/or of multiple transmitters, such as transmitters 102a, 102b, . . . , 102n) transmit two or more power waves that intersect at a defined location (e.g., a location corresponding to a detected location of a power harvesting circuitry 120), thereby forming a pocket of energy at the defined location.

In some embodiments, transmitter 102 assigns a first task to a first subset of antenna elements of antenna array 110, a second task to a second subset of antenna elements of antenna array 110, and so on, such that the constituent antennas of antenna array 110 perform different tasks (e.g., determining locations of previously undetected receivers 120 and/or transmitting power waves 116 to one or more receivers 120). As one example, in an antenna array 110 with ten antennas, nine antennas transmit power waves 116 that form a pocket of energy and the tenth antenna operates in conjunction with communications component 112 to identify new receivers in the transmission field. In another example, an antenna array 110 having ten antenna elements is split into two groups of five antenna elements, each of which transmits power waves 116 to two different power harvesting circuitries 120 in the transmission field.

Figure 2:
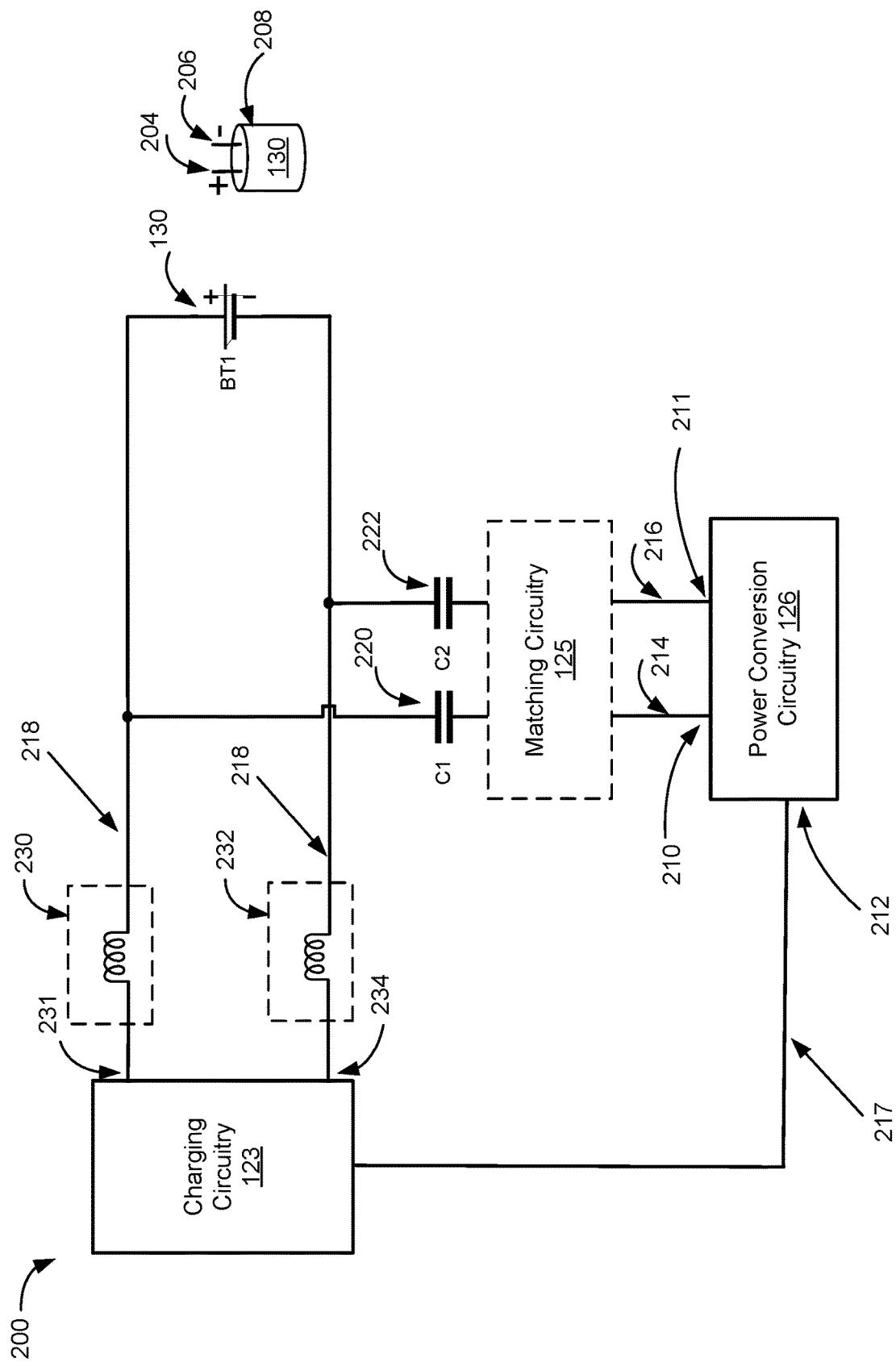
FIG. 2 is a diagram of an example receiver circuitry of a wireless power receiver in accordance with some embodiments.

FIG. 2 is a diagram of an example receiver circuitry 200 of a wireless power receiver 120 in accordance with some embodiments. In some embodiments, one or more components of receiver circuitry 200 as shown in FIG. 2 are included in receiver 120 as shown in FIG. 1. In some embodiments, receiver circuitry 200 includes one or more battery terminals 150 (e.g., a positive terminal 204 and a negative terminal 206) configured to receive RF power signals 116 from transmitter 102. In some embodiments, two battery terminals 150 are used as antennas (e.g., as a dual feed mode or as a parallel plate antenna) configured to receive RF power signals 116 as discussed with reference to FIG. 2. In some alternative embodiments, a single battery terminal (e.g., either the positive terminal 204 or the negative terminal 206) is used as an antenna (as a single feed mode or as a monopole antenna) configured to receive RF power signals 116 as discussed with reference to FIG. 3A (i.e., using negative battery terminal 206 as antenna) and FIG. 3B (i.e., using positive battery terminal 204 as an antenna). In some embodiments, receiver circuitry 200 includes a battery housing 208 configured to receive RF power signals 116. In some embodiments, receiver circuitry 200 includes power conversion circuitry 126 coupled to battery terminals 150.

In some embodiments, receiver circuitry 200 includes matching circuitry 125 coupled between battery terminals 150 and power conversion circuitry 126. In some embodiments, an output 212 of power conversion circuitry 126 is coupled with charging circuitry 123, which is further coupled to battery 130 (e.g., via battery terminals 150). In some embodiments, receiver circuitry 200 comprises one or more capacitors (e.g., capacitors 220 and 222) coupled between matching circuitry 125 and positive and negative terminals 204 and 206 respectively. In some embodiments, receiver circuitry 200 further comprises one or more RF chokes (e.g., inductors) 230 and 232 coupled between charging circuitry 123 and battery 130. In some embodiments, RF chokes 230 and 232 are optional. That is, charging circuitry 123 may not include RF chokes.

In some embodiments, receiver 120 includes at least a part of battery 130 acting as antenna configured to receive RF signals transmitted from transmitter(s) 120. In some embodiments, one or more battery terminals 150 are used as antennas. In some embodiments, battery 130 includes two or more terminals (e.g., a positive terminal 204 and a negative terminal 206) that are connected to other components of receiver circuitry 200. In some embodiments, the two or more terminals are respective components that are used to conduct electricity flowing into and out of battery 130. In some embodiments, other part(s) of battery 130 act as antenna(s), such as metallic holder(s) 208 (used interchangeably herein as case(s)) and/or a metallic housing for battery 130. In some embodiments, the part(s) of battery 130 that are used as antenna(s) are made of metal materials or any other type(s) of electrically conductive material(s).

In some embodiments as shown in FIG. 2, receiver circuitry 200 uses two terminals (e.g., both positive terminal 204 and negative terminal 206) of battery 130 as receiving antennas to receive RF signals. In some embodiments, positive terminal 204 and negative terminal 206 are both electrically coupled to an input (e.g., a power conversion circuitry first terminal 210 and/or a power conversion circuitry second terminal 211) of power conversion circuitry 126.

In some embodiments, power conversion circuitry 126 includes a rectifier and/or a power converter. In some embodiments, the rectifier is configured to rectify alternating current (AC) generated by reception of RF signals at the antenna elements 204 to direct current (DC). After rectifying AC, the resulting DC may be regulated using the power converter (not shown). In some embodiments, a power converter can be a DC-to-DC converter that may help provide a constant voltage output, regardless of input, to an electronic device, or to battery 130. In some embodiments, power conversion circuitry 126 includes a power conversion circuitry first terminal 210 electrically coupled with battery positive terminal 204 via a first electrical connection 214 (e.g., one or more wires), and a power conversion circuitry second terminal 211 electrically coupled with battery negative terminal 206 via a second electrical connection 216 (e.g., one or more wires). In some embodiments, power conversion circuitry first terminal 210 and/or power conversion circuitry second terminal 211 are regarded as a connector of power conversion circuitry 126.

In some embodiments, input (e.g., power conversion circuitry first terminal 210 and/or power conversion circuitry second terminal 211) of power conversion circuitry 126 receives RF power signals received by at least a part of battery 130 as discussed herein. In some embodiments, power conversion circuitry 126 converts alternating current (AC) generated by reception of the RF power signals to usable electricity (e.g., DC voltage) to be provided to charging circuitry 123 to charge battery 130. In some embodiments, positive terminal 204 and negative terminal 206 are capable of operating in frequency bands such as 900 MHz, 2.5 GHz, or 5.8 GHz as these frequency bands conform to Federal Communications Commission (FCC) regulations part 18 (industrial, scientific, and medical equipment). In some embodiments, one of positive terminal 204 and negative terminal 206 is used to receive power waves of a first frequency, and the other one is used to received power waves of a second frequency that is different from the first frequency. In some embodiments, both positive terminal 204 and negative are used to received power waves of the same frequency. In some embodiments, a terminal is used to receive power waves having multiple different frequencies.

In some embodiments, charging circuitry 123 is configured to drain DC voltage from battery 130, and provide such DC voltage to electronic device 122. In some embodiments, receiver circuitry 200 further includes capacitor 220 and capacitor 222 that are used to collect DC voltage that flows out of battery 130 to prevent such DC voltage from being received by power conversion circuitry 126. In some embodiments, capacitor 220 is coupled in series between input 210 of power conversion circuitry 126 and positive terminal 204, and capacitor 222 is coupled in series between input 210 of power conversion circuitry 126 and negative terminal 206. In some embodiments, capacitor 220 and capacitor 222 are also configured to allow alternating current (e.g., generated by reception of RF signals at receiving antenna(s)) at a desired frequency or frequencies to flow to the power conversion circuitry 126.

In some embodiments, matching circuitry 125 (also interchangeably referred to as an impedance matching circuitry) is coupled between power conversion circuitry 126 and capacitors 220 and 222. As discussed with reference to FIG. 1, in some embodiments, matching circuitry 125 includes combinations of inductor and/or capacitors and the matching circuitry 125 is configured to adjust an impedance of matching circuit 125 in accordance with the charging status of battery 130. In some embodiments, when charging circuitry 123 determines that the charge state of battery 130 is substantially full (e.g., the charging circuitry 123 determines that the battery has a charge level that is 95%-100% of its maximum capacity), matching circuit 125 adjusts its own impedance to a first impedance value such that transfer of alternating current (AC) generated by reception of wirelessly delivered RF power signals from battery 130 to power conversion circuitry 126 is substantially blocked (e.g., all of the AC is prevented from flowing to the power conversion circuitry 126), wherein the RF power signals are received via positive terminal 204 and negative terminal 206 of battery 130. In some embodiments, the first impedance value is selected so that there is a substantial mismatch between the first impedance value and the impedance of battery 130 when it is at a substantially fully charged state (e.g., the first impedance value is selected to be different from an impedance created by battery 130 when it is in its substantially fully charged state).

In some embodiments, when battery 130 is in a substantially fully charged state, the matching circuitry 125 is detuned, e.g., the capacitance of matching circuit 125 is adjusted such that a resonant frequency of matching circuit 125 is different from the frequencies of RF power signals received by the receiving antenna of battery 130. In some embodiments, receiver 120 (or communications component(s) 136 of electronic device 122*a*) sends a signal to transmitter 102 (e.g., through Bluetooth) to notify transmitter 102 that battery 130 is substantially full and/or to instruct transmitter 102 to stop transmitting RF power signals 116. In some embodiments, a flow of current to the battery 130 may also be interrupted by using a control switch (e.g. an operational amplifier) to switch the output 212 of power conversion circuitry 126 to a different resistor so that this current does flow to battery 130.

In some embodiments, when charging circuitry 123 determines that the charge state of battery 130 is not full, such as less than a predetermined threshold (e.g., 99%, 90%, 70%, or 50% charged), matching circuit 125 adjusts its own impedance to a second value such that transfer of AC generated by reception of wirelessly delivered RF power signals from battery 130 to power conversion circuitry 126 is not blocked. In some embodiments, the second impedance value matches the impedance of battery 130 at a corresponding charge state. In some embodiments, charging circuitry 123 detects the charge state of battery 130 periodically and communicates with matching circuitry 125 an up-to-date charge state of battery 130. In some embodiments, matching circuitry 125 adjusts its impedance dynamically in accordance with the received up-to-date charge state of battery 130 to ensure that AC generated by reception of the RF power signals continue to flow to power conversion circuitry 126.

In some embodiments, charging circuitry 123 is coupled to battery 130. In some embodiments, charging circuitry 123 has at least two charging circuit terminals, including a charging circuit positive terminal 231 electrically coupled to battery positive terminal 204, and a charging circuit negative terminal 234 electrically coupled to battery negative terminal 206. In some embodiments, charging circuitry 123 is coupled to battery 130 via electrical connections 218 (e.g., one or more wires). In some embodiments, charging circuitry 123 is further coupled to output 212 of power conversion circuitry 126 via an electrical connection 217 (e.g., one or more wires). In some embodiments, charging circuitry 123 comprises combinations of diodes, resistors, inductors, and/or capacitors. In some embodiments, charging circuitry 123 is configured to receive usable power (e.g., also referred herein as additional DC voltage) from battery 150 when battery 130 discharges. In some embodiments, charging circuitry 123 is configured to charge battery 130 using DC energy (e.g., DC voltage, or DC power signals) received from output 212 of power conversion circuitry 126 when battery 130 charges. In some embodiments, charging circuitry 123 is configured to use electrical connections 218 to charge battery 130.

In some embodiments, charging circuitry 123 is configured to measure a charge state of battery 130 by measuring an OCV and/or an impedance of battery 130. In some embodiments, charging circuitry 123 is further configured to determine an amount of the energy (e.g., in DC voltage) to provide to the battery during the charging of the battery using the DC voltage. For example, when charging circuitry 123 measures that the charge state of battery 130 is at 70%, charging circuitry 123 determines that 30% of a full battery capacity is needed to charge the battery. In some embodiments, charging circuitry 123 is configured to measure the charge state of battery 130 periodically (e.g., once every 10 minutes).

In some embodiments, when the OCV and/or the impedance of battery 130 indicate that an energy level of battery 130 is low (e.g., lower than a predetermined threshold), one or more components of matching circuitry 125 will be adjusted to obtain an impedance value of matching circuitry 125 that substantially matches a current impedance value of battery 130. In this situation, transfer of AC generated by reception of RF power signals from battery 130 to power conversion circuitry 126 will be ensured. More energy from RF power signals (e.g., alternating current generated by reception of RF signals) can be converted to DC power by power conversion circuitry 126, and this DC power is then provided by charging circuitry 123 to charge battery 130.

In some embodiments, when the OCV and/or the impedance of battery 130 indicate the energy level of battery 130 is substantially full, one or more components of matching circuitry 125 will be adjusted to obtain an impedance value of matching circuitry 125 that mismatches an impedance value of battery 130 when it has a substantially fully charged state (e.g., greater than 95% of full battery charge for the battery 130). In this situation, transfer of alternating current generated by reception of RF power signals received via components of the battery 130 that are operating as RF receiving antennas (e.g., battery terminals 204 and 206) from battery 130 to power conversion circuitry 126 can be substantially blocked by adjusting impedance values in this way.

In some embodiments, receiver circuitry 200 further includes RF choke 230 coupled in series between positive terminal 204 and charging circuitry 123, and RF choke 232 coupled in series between negative terminal 206 and charging circuitry 123. In some embodiments, the RF choke 232 includes an inductor configured to block alternating current generated by reception of RF signals from flowing to the charging circuitry 123.

In some embodiments, matching circuitry 125 is optional. When receiver circuitry 200 does not include matching circuitry 125, in some embodiments, battery terminals 204 and 206 are coupled to power conversion circuitry 126 via capacitors 220 and 222. In some embodiments, charging circuitry 123 is configured to control the amount of DC power transferred to battery 130 in accordance with the charge state of battery 130. In some embodiments, power conversion circuitry 126 is configured to control how much of the energy (e.g., AC voltage) from RF signals should be converted to DC power based on the charge state of battery 130. In some embodiments, battery 130 includes suitable components configured to manage battery charging process in accordance with the charge state of battery 130.

Figure 3A:
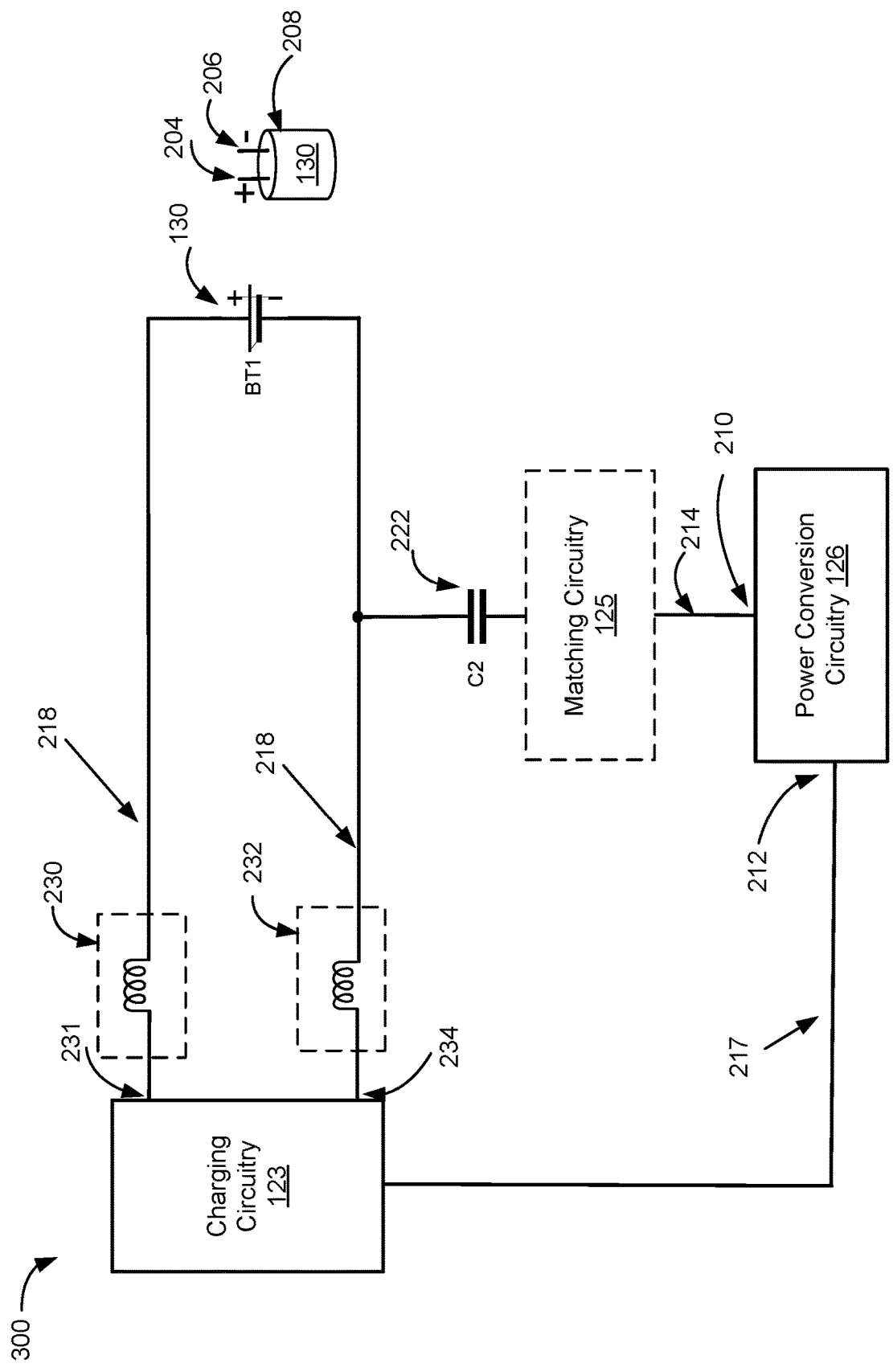
FIG. 3A is a diagram of an example receiver circuitry of a wireless power receiver in accordance with some embodiments.

FIG. 3A is a diagram of an example receiver circuitry 300 of a wireless power receiver in accordance with some embodiments. In some embodiments, receiver circuitry 300 includes a single battery terminal, e.g., negative terminal 206 of battery 130, as a receiving antenna. In some embodiments, negative terminal 206 is configured to receive RF power signals 116 from transmitter 102. In some embodiments, receiver circuitry 300 includes power conversion circuitry 126 having a power conversion circuitry terminal 210 coupled to negative terminal 206. In some embodiments, power conversion circuitry 126 is configured to convert a voltage (e.g., AC voltage) generated by RF signals received via negative terminal 206 to DC voltage. In some embodiments, receiver circuitry 300 includes matching circuitry 125 coupled between power conversion circuitry 126 and negative terminal 206.

In some embodiments, matching circuitry 125 is configured to control transfer of AC generated by reception of wirelessly delivered RF signals from negative terminal 206 to power conversion circuitry 126 in accordance with a charge state of battery 130. In some embodiments, capacitor 222 is coupled between negative terminal 206 and power conversion circuitry 126. In some embodiments, capacitor 222 is configured to block DC voltage (e.g., drained from battery 130) from being received by power conversion circuitry 126. In some embodiments, receiver circuitry 300 includes charging circuitry 123 coupled to battery 130 (e.g., a charging circuitry terminals 231 and 234 coupled to battery terminals 204 and 206 respectively). In some embodiments, charging circuitry 123 is configured to charge battery 130 using DC voltage received from power conversion circuitry 126. In some embodiments, receiver circuitry 300 includes RF choke 230 (e.g., inductor) coupled between positive terminal 204 and charging circuitry positive terminal 231, and RF choke 232 coupled between negative terminal 206 and charging circuitry negative terminal 234. In some embodiments, RF chokes 230 and 232 are configured to block alternating current generated by reception of RF signals from being received by charging circuitry 123. In some embodiments, matching circuitry 125 is optional in receiver circuitry 300.

In some embodiments, when receiver circuitry 300 does not include matching circuitry 125, negative terminal 206 is coupled to power conversion circuitry 126 via capacitor 222. In some embodiments, battery 130 and battery terminals 204 and 206, matching circuitry 125, power conversion circuitry 126 and its terminal 210, charging circuitry 123 and its terminals 231 and 234, capacitor 222, and RF chokes 230 and 232 are substantially similar to respective components with the same reference numbers as discussed with reference to FIG. 2.

Figure 3B:
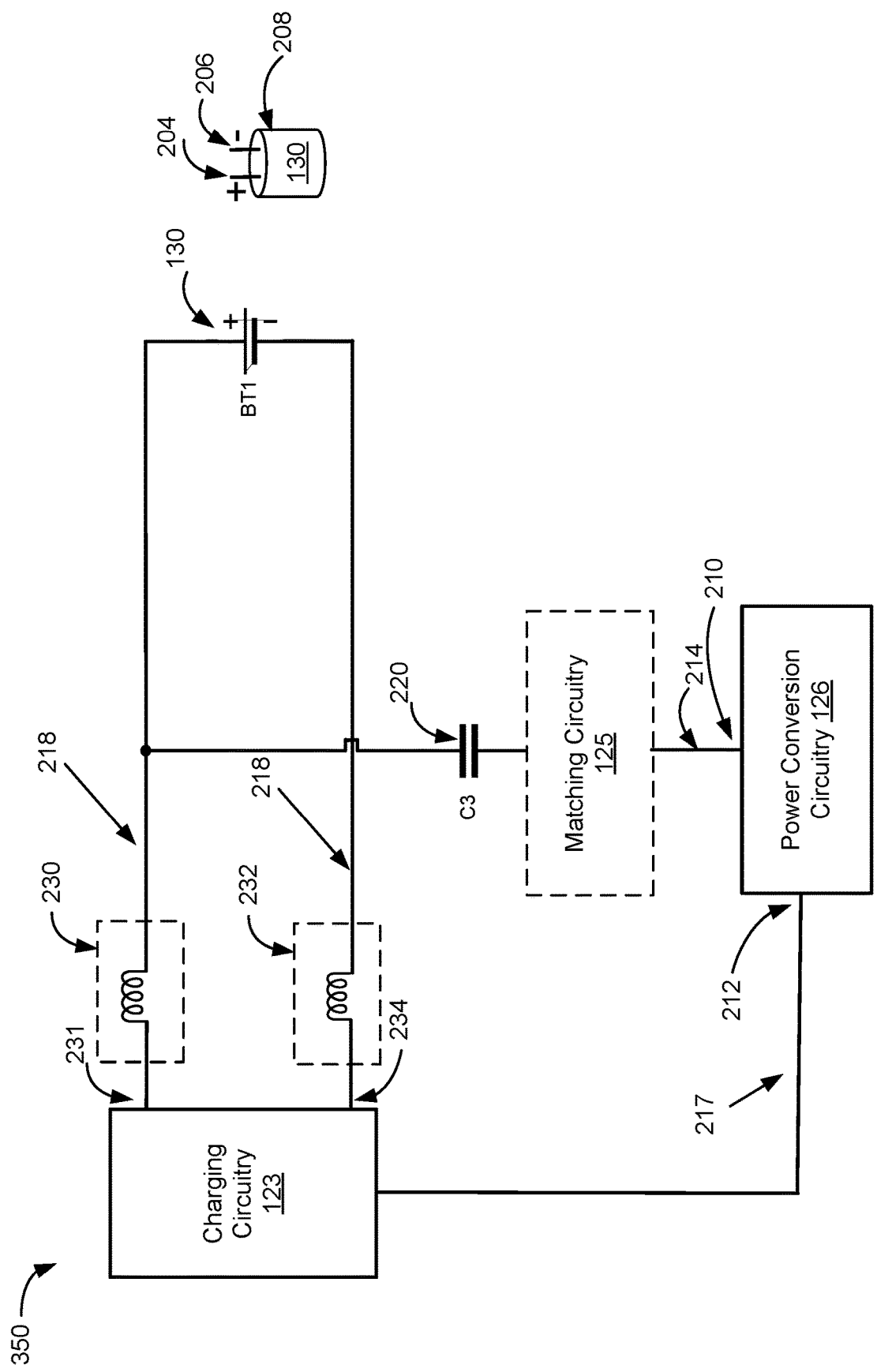
FIG. 3B is a diagram of an example receiver circuitry of a wireless power receiver in accordance with some embodiments.

FIG. 3B is a diagram of an example receiver circuitry 350 of a wireless power receiver in accordance with some embodiments. In some embodiments, receiver circuitry 350 includes a single battery terminal, e.g., positive terminal 204 of battery 130, as a receiving antenna. In some embodiments, positive terminal 204 is configured to receive RF power signals 116 from transmitter 102. In some embodiments, receiver circuitry 350 includes power conversion circuitry 126 having a power conversion circuitry terminal 210 coupled to positive terminal 204.

In some embodiments, power conversion circuitry 126 is configured to convert RF signals received from positive terminal 204 to DC voltage. In some embodiments, receiver circuitry 350 includes matching circuitry 125 coupled between power conversion circuitry 126 and positive terminal 204. In some embodiments, matching circuitry 125 is configured to control transfer of AC generated by reception of wirelessly delivered RF signals from positive terminal 204 to power conversion circuitry 126 in accordance with a charge state of battery 130. In some embodiments, capacitor 220 is coupled between positive terminal 204 and power conversion circuitry 126. In some embodiments, capacitor 220 is configured to block DC voltage (e.g., DC energy drained from battery 130) from being received by power conversion circuitry 126.

In some embodiments, receiver circuitry 350 includes charging circuitry 123 coupled to battery 130 (e.g., a charging circuitry terminals 231 and 234 coupled to battery terminals 204 and 206 respectively). In some embodiments, charging circuitry 123 is configured to charge battery 130 using DC voltage received from power conversion circuitry 126. In some embodiments, receiver circuitry 350 includes RF choke 230 (e.g., inductor) coupled between positive terminal 204 and charging circuitry positive terminal 231, and RF choke 232 coupled between negative terminal 206 and charging circuitry negative terminal 234. In some embodiments, RF chokes 230 and 232 are configured to block alternating current generated by reception of RF signals from being received by charging circuitry 123. In some embodiments, matching circuitry 125 is optional in receiver circuitry 350. When receiver circuitry 350 does not include matching circuitry 125, positive terminal 204 is coupled to power conversion circuitry 126 via capacitor 220. In some embodiments, battery 130 and battery terminals 204 and 206, matching circuitry 125, power conversion circuitry 126 and its terminal 210, charging circuitry 123 and its terminals 231 and 234, capacitor 220, and RF chokes 230 and 232 are substantially similar to respective components with the same reference numbers as discussed with reference to FIG. 2.

Figure 4:
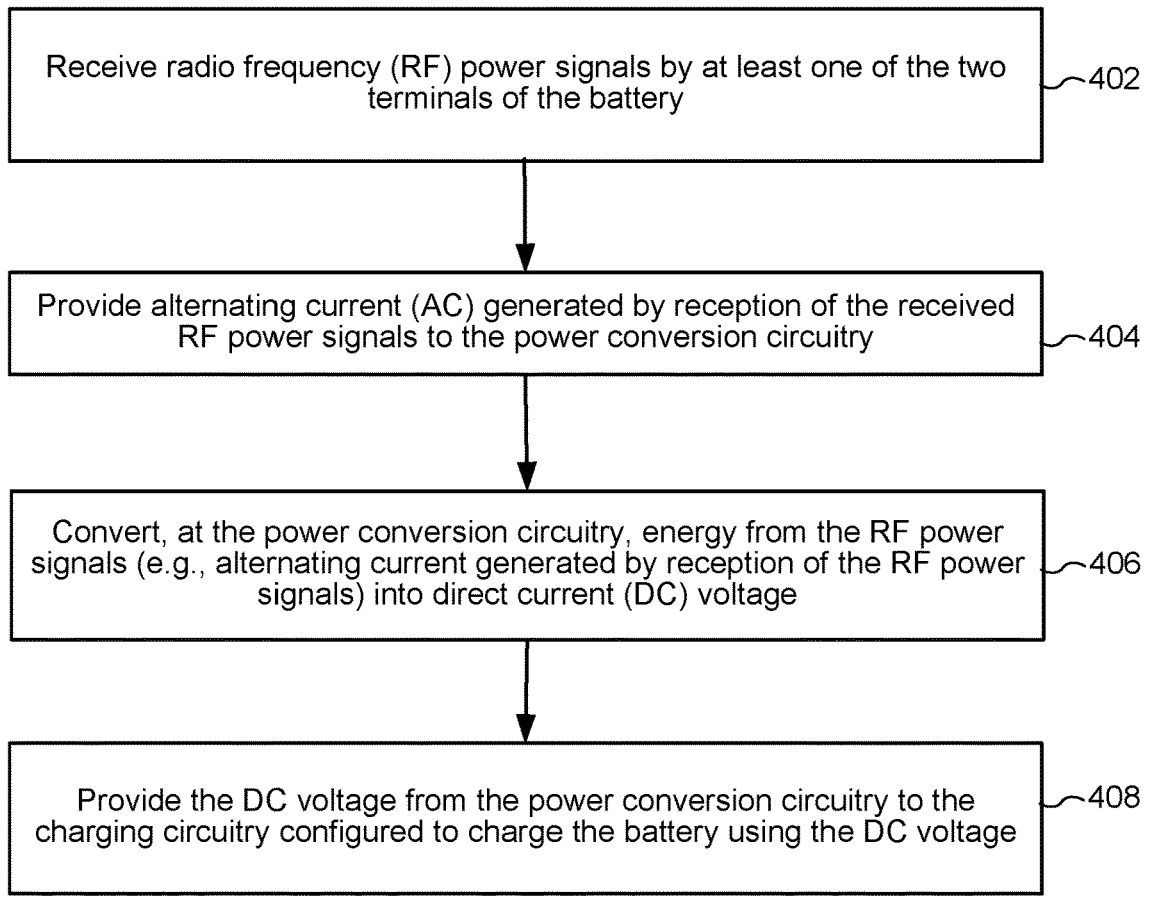
FIG. 4 is a flow diagram showing a method of receiving wireless power using a wireless power receiver, in accordance with some embodiments.

FIG. 4 is a flow diagram showing a method 400 of receiving wireless power, in accordance with some embodiments. In some embodiments, operations of method 400 are performed by a wireless power receiver (e.g., receiver 120, FIGS. 1-2 and 3A-3B) or by one or more components thereof. In some embodiments, operations (e.g., steps) of method 400 are performed by an electronic device (e.g., electronic device 122, FIG. 1) including a wireless power receiver (e.g., receiver 120, FIGS. 1-2 and 3A-3B) or by one or more components thereof. At least some of the operations shown in FIG. 4 correspond to instructions stored in a computer memory or non-statutory computer-readable storage medium (e.g., memory 134 of electronic device 122 and/or a memory (not shown) of receiver 120, FIG. 1).

In some embodiments, the wireless power receiver (e.g., receiver 120, FIGS. 1-2 and 3A-3B) includes one or more components of a battery (e.g., two terminals of a battery, such as the battery 130 shown in FIGS. 1-2 and 3A-3B)). In some embodiments, the battery 130 supplies power to an electronic device (e.g., electronic device 122, FIG. 1) that includes the wireless power receiver. In some embodiments, the two terminals of battery include a positive terminal (e.g., positive terminal 204, FIGS. 2 and 3A-3B) and a negative terminal (e.g., negative terminal 206, FIGS. 2 and 3A-3B).

In some embodiments, the wireless power receiver comprises power conversion circuitry (e.g., power conversion circuitry 126, FIGS. 1-2 and 3A-3B) having an input (e.g., input 210, FIGS. 2 and 3A-3B) and an output (e.g., output 212, FIGS. 2 and 3A-3B). In some embodiments, the input electrically is coupled to the at least one of the two terminals of the battery. In some embodiments, the power conversion circuitry is configured to convert energy from the received RF power signals into a direct current (DC) voltage.

In some embodiments, the wireless power receiver also comprises a first inductor (e.g., a RF choke 230, FIGS. 2 and 3A-3B) coupled between the positive terminal and charging circuitry (e.g., charging circuitry 123, FIGS. 1-2 and 3A-3B), and a second inductor (e.g., a RF choke 232, FIGS. 2 and 3A-3B) coupled between the negative terminal and the charging circuitry. In some embodiments, the first inductor and the second inductor are configured to block alternating current generated by reception of the received RF power signals from being received by the charging circuitry.

In some embodiments, the electronic device comprises charging circuitry (e.g., charging circuitry 123, FIGS. 1-2 and 3A-3B) that is coupled to the positive terminal and the negative terminal of the battery. In some embodiments, the charging circuitry is also coupled to the output of the power conversion circuitry. In some embodiments, the charging circuitry is further coupled to the electronic device. The charging circuitry is configured to: (1) charge the battery using the DC voltage received from the output of the power conversion circuitry; and (2) provide usable power received from the battery (e.g., an additional DC voltage from the battery) to the electronic device.

Method 400 comprises receiving (402) radio frequency (RF) power signals (e.g., RF power signals 116, FIG. 1) by at least one of the two terminals of the battery. In some embodiments, at least one of the two terminals is configured to act as an antenna to wirelessly receive radio frequency (RF) power signals. In some embodiments, as discussed with reference to FIG. 2, both positive terminal and the negative terminal act as antennas to wirelessly receive RF power signals. In some embodiments as discussed with reference to FIG. 3A, only negative terminal is used as an antenna to wirelessly receive RF power signals. In some embodiments as discussed with reference to FIG. 3B, only positive terminal acts as an antenna to wirelessly receive RF power signals. In some embodiments, the RF power signals are transmitted from one or more wireless transmitters (e.g., transmitter 102, FIG. 1). In some embodiments, a battery housing (e.g., housing 208, FIG. 2) is configured to act as an antenna to wirelessly receive radio frequency (RF) power signals.

Method 400 comprises providing (404) alternating current generated by reception of the received RF power signals to the power conversion circuitry. In some embodiments, the power conversion circuitry is configured to convert alternating current generated by reception of the received RF power signals into direct current (DC) voltage. In some embodiments, the power conversion circuitry has an output (e.g., output 212, FIGS. 2 and 3A-3B) coupled to the charging circuitry and an input (e.g., input 210, FIGS. 2 and 3A-3B) electrically coupled to at least one of the terminals of the battery.

In some embodiments as discussed with reference to FIG. 2, the input of the power conversion circuitry is coupled with the positive terminal via a first connection, and the input of the power conversion circuitry is further coupled with the negative terminal via a second connection. In some embodiments, the first connection includes a first capacitor (e.g., capacitor 220, FIG. 2). In some embodiments, the second connection includes a second capacitor (e.g., capacitor 222, FIG. 2). In some embodiments, the first and the second capacitors are configured to block DC voltage (e.g., DC energy drained from battery 130) from being received by the power conversion circuitry. In some embodiments, the first and the second capacitors are optional.

In some embodiments as discussed with reference to FIG. 3A, the input of the power conversion circuitry is coupled with the negative terminal via a connection. In some embodiments, the connection includes a capacitor (e.g., capacitor 222, FIG. 3A). In some embodiments as discussed with reference to FIG. 3B, the input of the power conversion circuitry is coupled with the positive terminal via a connection. In some embodiments, the connection includes a capacitor (e.g., capacitor 220, FIG. 3B). In some embodiments, the capacitor as discussed with reference to FIGS. 3A-3B is configured to block DC voltage (e.g., an additional DC voltage that is discharged by the battery and provided to the charging circuitry to use for powering the electronic device) from being received by the power conversion circuitry.

Method 400 comprises converting (406) energy from the RF power signals (i.e., an AC voltage that is generated in the receiver after reception of the RF power signals transmitted by a wireless power transmitter) into direct current (DC) voltage by the power conversion circuitry. Method 400 further comprises providing (408) the DC voltage from the power conversion circuitry to the charging circuitry. In some embodiments, the charging circuitry is configured to charge the battery using the DC voltage received from the output of the power conversion circuitry. In some embodiments, the battery is configured to store usable power to power various functions of an electronic device (e.g., electronic device 122, FIG. 1). In some embodiments, the charging circuitry is further configured to receive usable power from the battery.

In some embodiments, the charging circuitry is further configured to measure a charge state of the battery which is used to facilitate charging of the battery. In some embodiments, the charging circuitry is configured to measure an OCV of the battery to determine a current charge state of the battery. In some embodiments, the charging circuitry is configured to measure an impedance of the battery to determine a current charge state of the battery. In some embodiments, the charging circuitry is also configured to determine an amount of the DC voltage to provide to the battery during the charging of the battery using the DC voltage based on the charge state of the battery. For example, when the charge state of the battery is measured to be 70%, the charging circuitry further determines that substantially 30% of a fully charged battery capacity is needed to be provided to the battery. Such information may be provided to the impedance matching circuitry to adjust the impedance of the impedance matching circuitry accordingly such that no less than this amount of energy is transferred from battery terminal(s) (while the battery terminal(s) are receiving the RF power signals) to the power conversion circuitry.

In some embodiments as discussed with reference to FIG. 2, when both positive and negative terminals (e.g., positive terminal 204 and negative terminal 206, FIG. 2) are used as receiving antennas, the wireless power receiver optionally comprises matching circuitry (e.g., matching circuitry 125, FIG. 2) coupled between the power conversion circuitry (e.g., power conversion circuitry 126, FIG. 2) and the first and the second capacitors (e.g., capacitors 220 and 222, FIG. 2). In some embodiments as discussed with reference to FIGS. 3A-3B, when a single terminal (e.g., negative terminal 206 of FIG. 3A, or positive terminal 204 of FIG. 3B) is used as a receiving antenna, the wireless power receiver optionally comprises matching circuitry (e.g., matching circuitry 125, FIGS. 3A-3B) coupled between the power conversion circuitry (e.g., power conversion circuitry 126, FIGS. 3A-3B) and the capacitor (capacitor 222 of FIG. 3A or capacitor 220 of FIG. 3B).

In some embodiments, the matching circuitry comprises combinations of inductors and capacitors. In some embodiments, the matching circuitry is configured to adjust an impedance of the matching circuitry according to a charge state of the battery (e.g., measured by the charging circuitry). In some embodiments, in accordance with a determination that the charge state of the battery is substantially full, the impedance of the matching circuitry is adjusted to mismatch the impedance of the fully charged battery to substantially block transfer of AC generated by reception of wirelessly delivered RF power signals from the battery to the power conversion circuitry. In some embodiments, in accordance with a determination that the charge state of the battery is not full (e.g., less than a predetermined threshold), the impedance of the matching circuitry is adjusted to substantially match the impedance of the battery at current charge state to ensure the transfer of AC generated by reception of wirelessly delivered RF power signals from the battery to the power conversion circuitry. In some embodiments, the matching circuitry is further configured to dynamically adjust the impedance of the matching circuitry in accordance with the charge state of the battery measured by the charging circuitry.

In some embodiments, the electronic device further includes a communication radio (e.g., communication component(s) 136, FIG. 1) that operates on a first frequency band that is distinct from a second frequency band at which the RF power signals are received (e.g., via battery terminal(s) 150) by the wireless power receiver. For example, the first frequency band has a center frequency of approximately 2.4 GHz and the second frequency band has a center frequency of approximately 900 MHz or 5.8 GHz.

Figure 5:
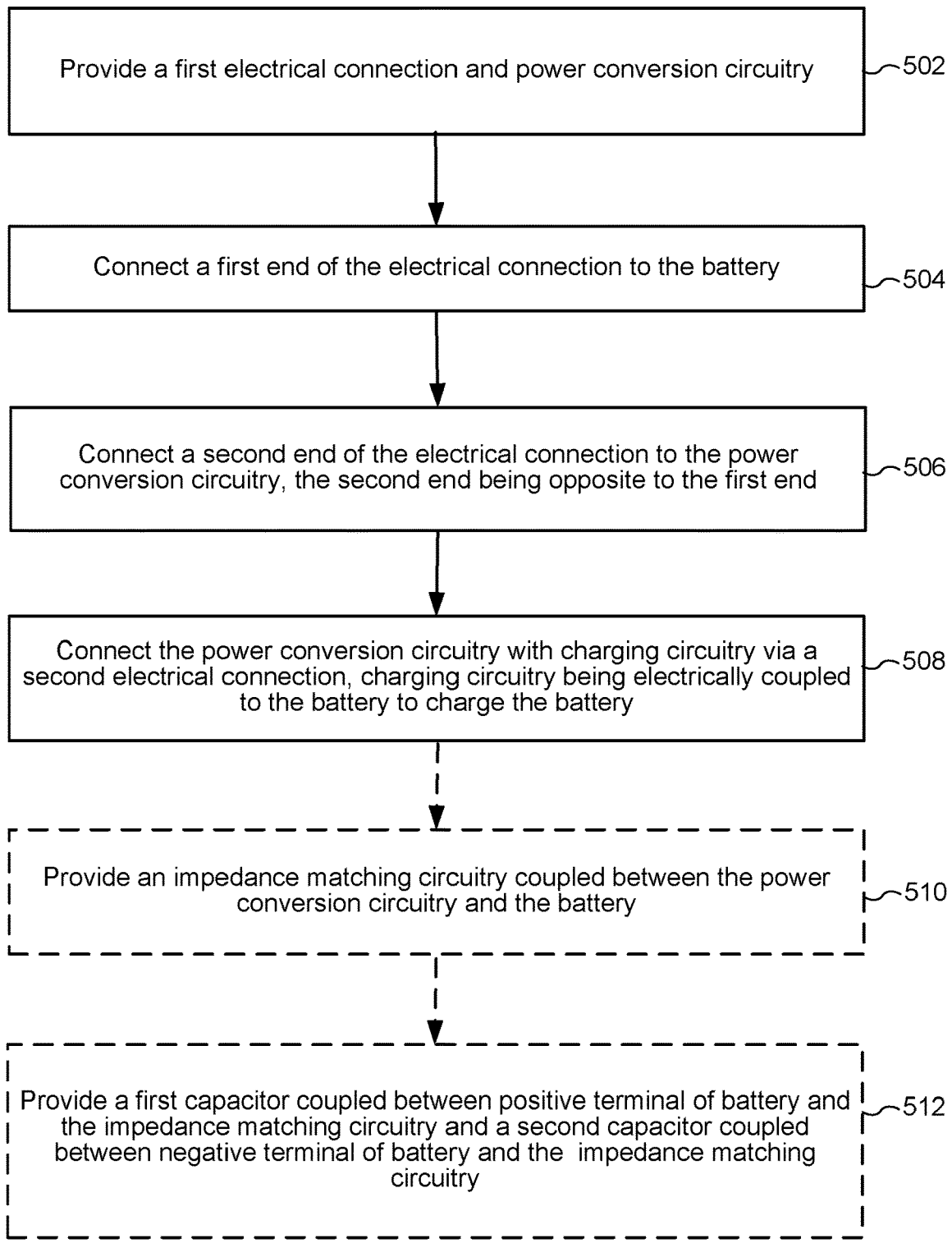
FIG. 5 is a flow diagram showing a method of constructing a wireless power receiver, in accordance with some embodiments.

FIG. 5 is a flow diagram showing a method 500 of constructing a wireless power receiver, in accordance with some embodiments discussed above. In some embodiments, operations of method 500 are performed by a manufacturer of the wireless power receiver or by a company responsible for assembling and implementing the wireless power receiver in various electronic devices.

In some embodiments, method 500 includes providing (502) a first electrical connection (e.g., connection 214 and/or connection 216, FIG. 2) and a power conversion circuitry (e.g., power conversion circuitry 126, FIGS. 1-2, 3A-3B and 4). Method 500 may also include connecting (504) a first end of the electrical connection to the battery (e.g., battery 130, FIGS. 1-2, 3A-3B and 4). Method 500 further includes connecting (506) a second end of the electrical connection to the power conversion circuitry. The first end of the electrical connection is opposite to the second end of the electrical connection. In some embodiments, method 500 additionally includes connecting (508) the power conversion circuitry with charging circuitry (e.g., charging circuitry 123, FIGS. 1-2, 3A-3B and 4) via a second electrical connection (e.g., connection 217, FIG. 2). The charging circuitry is electrically coupled to the battery to charge the battery.

Optionally providing (510) an impedance matching circuitry (e.g., impedance matching circuitry 125, FIGS. 1-2, 3A-3B and 4) that is coupled between the power conversion circuitry and the battery is another step that may be performed in conjunction with method 500. Further, an additional step of optionally providing (512) a first capacitor (e.g., capacitor 220, FIG. 2) coupled between the positive terminal (e.g., positive terminal 204, FIG. 2) of the battery and the impedance matching circuitry and a second capacitor (e.g., capacitor 222, FIG. 2) coupled between the negative terminal (e.g., negative terminal 206, FIG. 2) of the battery and the impedance matching circuitry is a part of method 500 in accordance with some embodiments.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106 and/or memory 134) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 106 and/or memory 134, or alternatively the non-volatile memory device(s) within memory 106 and/or memory 134, comprises a non-transitory computer readable storage medium.

Stored on any one of the machine readable medium (media), features of the present invention can be incorporated in software and/or firmware for controlling the hardware of a processing system (such as the components associated with the transmitters 102 and/or receiver 120), and for enabling a processing system to interact with other mechanisms utilizing the results of the present invention. Such software or firmware may include, but is not limited to, application code, device drivers, operating systems, and execution environments/containers.

Communication systems as referred to herein (e.g., communications component 112 and/or communications component 136, FIG. 1) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZigBee, wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of constructing a wireless power receiver configured to receive wirelessly delivered power, the method comprising:
   providing power conversion circuitry;
   providing at least one battery having at least two battery terminals including a battery positive terminal and a battery negative terminal, and at least a part of the battery is configured to act as an antenna that wirelessly receives radio frequency (RF) power signals;
   coupling at least one of the at least two battery terminals to the power conversion circuitry, wherein the power conversion circuitry is configured to convert an alternating current (AC) generated by reception of the RF power signals received at the at least one battery into a direct current (DC) voltage; and
   providing charging circuitry having at least two charging circuit terminals, including a charging circuit positive terminal and a charging circuit negative terminal
   electrically coupling to the battery positive terminal via a first inductor;
   electrically coupling to the battery negative terminal via a second inductor; and
   electrically coupling the charging circuitry to the power conversion circuitry, wherein:
      the first inductor and the second inductor are configured to block the alternating current from being received by the charging circuitry, and
      the charging circuitry is configured to (i) receive the DC voltage from the power conversion circuitry and (ii) charge the at least one battery using the DC voltage.

2. The method of claim 1, wherein coupling the power conversion circuitry comprises:
   coupling at least one of the at least two battery terminals to the power conversion circuitry;

electrically coupling a power conversion circuitry first terminal with the battery positive terminal via a first electrical connection; and electrically coupling a power conversion circuitry second terminal with the battery negative terminal via a second electrical connection.

3. The method of claim 2, wherein:

the charging circuitry drains an additional DC voltage from the at least one battery and provides the additional DC voltage to an electronic device in which the wireless power receiver is embedded, the first electrical connection includes a first capacitor;

the second electrical connection includes a second capacitor, and the first and the second capacitors are configured to prevent the additional DC voltage from being received by the power conversion circuitry.

4. The method of claim 3, wherein the charging circuitry is further configured to:

measure a charge state of the at least one battery; and based on the charge state of the at least one battery, determine an amount of the DC voltage to provide to the battery during the charging of the battery using the DC voltage.

5. The method of claim 4, further comprising:

providing impedance matching circuitry; and coupling the impedance matching circuitry between the power conversion circuitry and the first and the second capacitors, wherein the impedance matching circuitry is configured to adjust, in accordance with a determination that the charge state of the at least one battery indicates that the battery is substantially full, an impedance of the impedance matching circuitry to substantially block flow of the alternating current to the power conversion circuitry.

6. The method of claim 5, wherein, while the charge state of the battery indicates that the at least one battery is not substantially full, the impedance matching circuitry is further configured to dynamically adjust the impedance of the impedance matching circuitry to match an impedance of the at least one battery to ensure that the alternating current flows to the power conversion circuitry.

7. The method of claim 3, wherein the electronic device further includes a communication radio that operates on a first frequency band that is distinct from a second frequency band at which the RF power signals are received by the wireless power receiver.

8. The method of claim 3, wherein the electronic device is (i) an item-finding device that is configured to indicate a location of an associated item to a user, or (ii) a home automation remote that is configured to control features of a user's home.

9. The method of claim 1, wherein coupling at least one of the at least two battery terminals to the power conversion circuitry comprises:

electrically coupling a power conversion circuitry terminal via an electrical connection with one of: (i) the battery positive terminal and (ii) the battery negative terminal;

the electrical connection includes a capacitor configured to prevent an additional DC voltage from being received by the power conversion circuitry; and the charging circuitry drains the additional DC voltage from the at least one battery and provides the additional DC voltage to an electronic device in which the wireless power receiver is embedded.

10. The method of claim 9, further comprising:

providing impedance matching circuitry; and coupling the impedance matching circuitry between the power conversion circuitry and the capacitor, wherein the charging circuitry is further configured to:

measure a charge state of the at least one battery; and based on the charge state of the at least one battery, determine an amount of the DC voltage to provide to the battery during the charging of the at least one battery using the DC voltage; and the impedance matching circuitry is configured to adjust, in accordance with a determination that the charge state of the at least one battery is substantially full, an impedance of the impedance matching circuitry to substantially block transfer of the alternating current to the power conversion circuitry.

11. The method of claim 1, wherein the part of the battery that is acting as the antenna comprises at least one of the at least two battery terminals and/or a housing of the at least one battery.

12. A method of constructing a wireless power receiver, comprising:

providing power conversion circuitry;

providing a first connection with a battery, wherein the first connection is configured to receive an alternating current that is generated by reception of wirelessly delivered radio frequency (RF) power signals, and the RF power signals are received by at least a part of the battery that is acting as an antenna; and coupling the power conversion circuitry to the first connection with the battery, wherein the power conversion circuitry is configured to convert the alternating current into a direct current (DC) voltage that is used to charge the battery.

13. The method of claim 12, further comprising:

providing a second connection, distinct from the first connection;

coupling the power conversion circuitry and charging circuitry via the second connection;

providing a third connection, distinct from the first and second connections; and coupling the charging circuitry with the battery via the third connection, wherein:

the third connection includes at least one inductor that is configured to block the alternating current from being received by the charging circuitry, and the charging circuitry is configured to:

receive, via the second connection, the DC voltage; and use the third connection to charge the battery using the DC voltage.

14. The method of claim 13, further comprising:

providing impedance matching circuitry; and coupling the impedance matching circuitry between the power conversion circuitry and the battery, the impedance matching circuitry configured to adjust, in accordance with a determination that a charge state of the battery indicates that the battery is substantially full, an impedance of the impedance matching circuitry to substantially block flow of the alternating current to the power conversion circuitry.

15. The method of claim 14, wherein the charge state of the battery is determined by the charging circuitry.

16. The method of claim 14, further comprising:
providing at least one capacitor; and
coupling the at least one capacitor between the impedance matching circuitry and the battery,
wherein:
the charging circuitry drains an additional DC voltage from the battery to provide power to an electronic device; and
the at least one capacitor is configured to substantially prevent the additional DC voltage from flowing to the power conversion circuitry.

17. The method of claim 16, wherein the wireless power receiver is embedded in the electronic device.

18. The method of claim 12, wherein the part of the battery that is acting as the antenna comprises at least one terminal of the battery and/or a housing of the battery.

19. A method of constructing a hearing aid with a wireless power receiving, the method comprising:
providing power conversion circuitry;
providing at least one battery having at least two battery terminals including a battery positive terminal and a battery negative terminal, and at least a part of the battery is configured to act as an antenna that wirelessly receives radio frequency (RF) power signals;
coupling at least one of the at least two battery terminals to the power conversion circuitry, wherein the power conversion circuitry is configured to convert an alternating current (AC) generated by reception of the RF power signals received at the at least one battery into a direct current (DC) voltage; and
providing charging circuitry having at least two charging circuit terminals, including a charging circuit positive terminal and a charging circuit negative terminal
electrically coupling to the battery positive terminal via a first inductor;
electrically coupling to the battery negative terminal via a second inductor; and
electrically coupling the charging circuitry to the power conversion circuitry, wherein:
the first inductor and the second inductor are configured to block the alternating current from being received by the charging circuitry, and
the charging circuitry is configured to (i) receive the DC voltage from the power conversion circuitry and (ii) charge the at least one battery using the DC voltage.

20. The method of claim 19, wherein coupling the power conversion circuitry comprises:
coupling at least one of the at least two battery terminals to the power conversion circuitry;
electrically coupling a power conversion circuitry first terminal with the battery positive terminal via a first electrical connection; and
electrically coupling a power conversion circuitry second terminal with the battery negative terminal via a second electrical connection.

* * * * *